United States Patent
Toda

(10) Patent No.: US 7,889,385 B2
(45) Date of Patent: Feb. 15, 2011

(54) DIGITAL IMAGE PRINTING SYSTEM, CONTROL METHOD THEREFOR, PRINTING DEVICE, CONTROL METHOD THEREFOR, AND COMPUTER PRODUCT

(75) Inventor: Katsuyuki Toda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1059 days.

(21) Appl. No.: 11/340,703

(22) Filed: Jan. 27, 2006

(65) Prior Publication Data
US 2006/0192796 A1    Aug. 31, 2006

(30) Foreign Application Priority Data
Jan. 28, 2005    (JP) ............... 2005-020976

(51) Int. Cl.
*G06F 15/00* (2006.01)
(52) U.S. Cl. ............ 358/1.9; 358/1.18; 358/1.13; 358/207.2; 358/715; 347/2
(58) Field of Classification Search ............ 347/2; 358/1.9, 715, 207.2, 1.18, 1.13
See application file for complete search history.

(56) References Cited

U.S. PATENT DOCUMENTS

| 5,550,623 | A * | 8/1996 | Tomita et al. ............ 399/83 |
| 6,654,140 | B1 * | 11/2003 | Hirata ............ 358/1.18 |
| 7,038,714 | B1 * | 5/2006 | Parulski et al. ............ 348/207.2 |
| 2003/0107169 | A1 * | 6/2003 | Rider ............ 271/225 |
| 2004/0032599 | A1 * | 2/2004 | Atkins et al. ............ 358/1.9 |
| 2004/0156064 | A1 * | 8/2004 | Owen et al. ............ 358/1.13 |
| 2004/0216046 | A1 * | 10/2004 | Warmus et al. ............ 715/530 |
| 2007/0268504 | A1 * | 11/2007 | Safer et al. ............ 358/1.13 |

FOREIGN PATENT DOCUMENTS

JP    2004-064740    2/2004

* cited by examiner

Primary Examiner—Twyler L Haskins
Assistant Examiner—Michael Burleson
(74) Attorney, Agent, or Firm—Harness, Dickey & Pierce, P.L.C.

(57) ABSTRACT

In a digital image printing system, an external device capable of storing digital image data, and a printing apparatus capable of printing the digital image data are mutually connectable, and capable of exchanging data. The printing apparatus includes a paper feeding unit having a multi-tray structure. The external device sends parameters, that is, paper size, paper type, page layout of the digital image data, and at least one digital image data to the printing apparatus, and the printing apparatus selects a tray from the paper feeding unit based on the parameters, and an aspect ratio of the digital image data, and prints the digital image data.

12 Claims, 33 Drawing Sheets

FIG. 7

| NUMBER OF IMAGES IN PRINT PACKAGE | PAGE LAYOUT ORIENTATION |
|---|---|
| 2 | PORTRAIT |
| 4 | LANDSCAPE |
| 8 | PORTRAIT |
| 9 | LANDSCAPE |
| 16 | LANDSCAPE |
| 25 | LANDSCAPE |
| 32 | PORTRAIT |

NUMBER OF IMAGES IN PRINT PACKAGE:
2/PAGE LAYOUT: PORTRAIT

NUMBER OF IMAGES IN PRINT PACKAGE:
4/PAGE LAYOUT: LANDSCAPE

NUMBER OF IMAGES IN PRINT PACKAGE:
8/PAGE LAYOUT: PORTRAIT

NUMBER OF IMAGES IN PRINT PACKAGE:
9/PAGE LAYOUT: LANDSCAPE

NUMBER OF IMAGES IN PRINT PACKAGE:
16/PAGE LAYOUT: LANDSCAPE

NUMBER OF IMAGES IN PRINT PACKAGE:
25/PAGE LAYOUT: LANDSCAPE

NUMBER OF IMAGES IN PRINT PACKAGE:
32/PAGE LAYOUT: PORTRAIT

IMAGE DATA: LANDSCAPE

PRINTED MATTER: LANDSCAPE

LANDSCAPE PAPER

PRINTED MATTER

FRAME MEMORY (LANDSCAPE)

FRAME MEMORY (PORTRAIT)

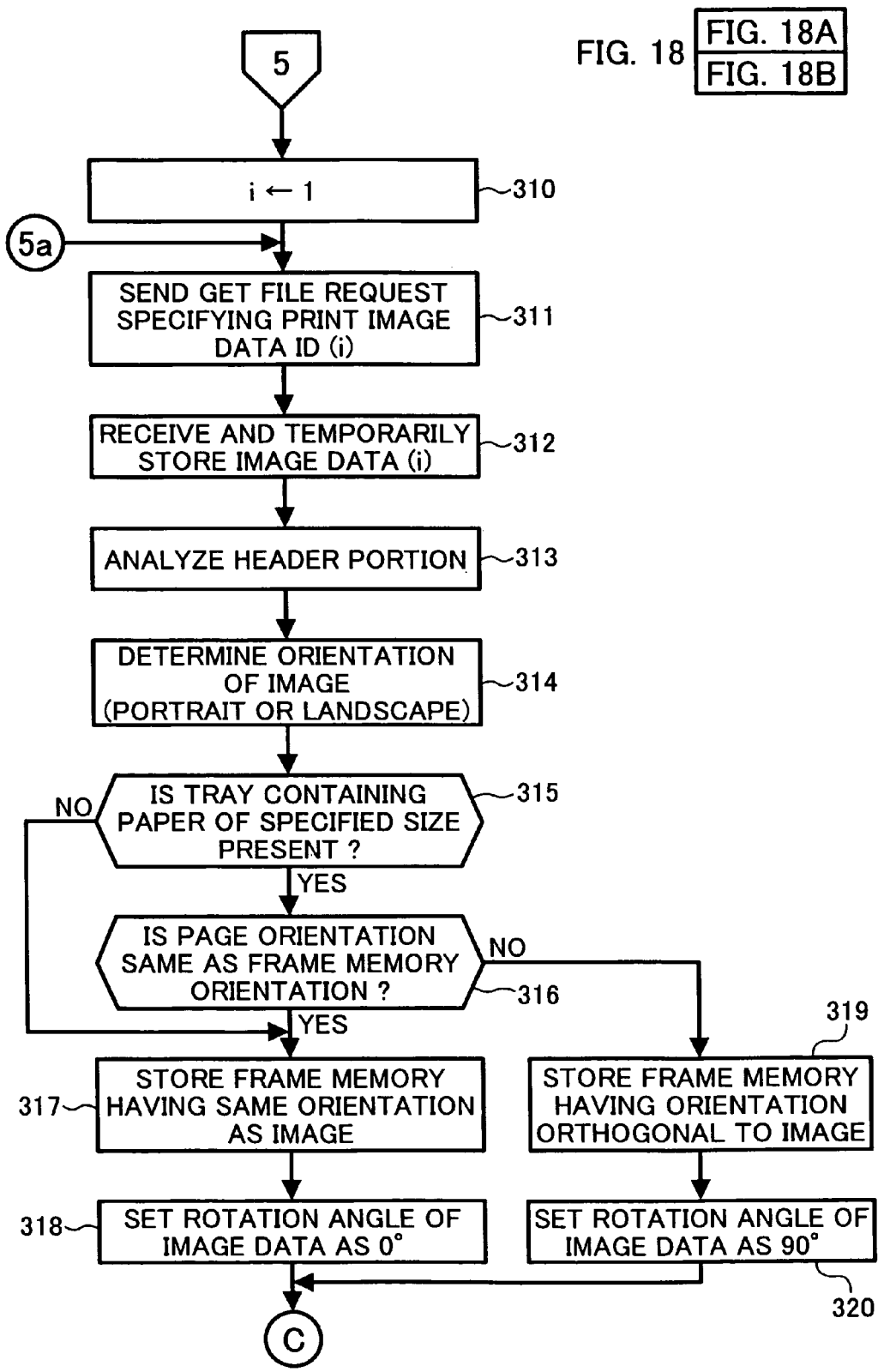

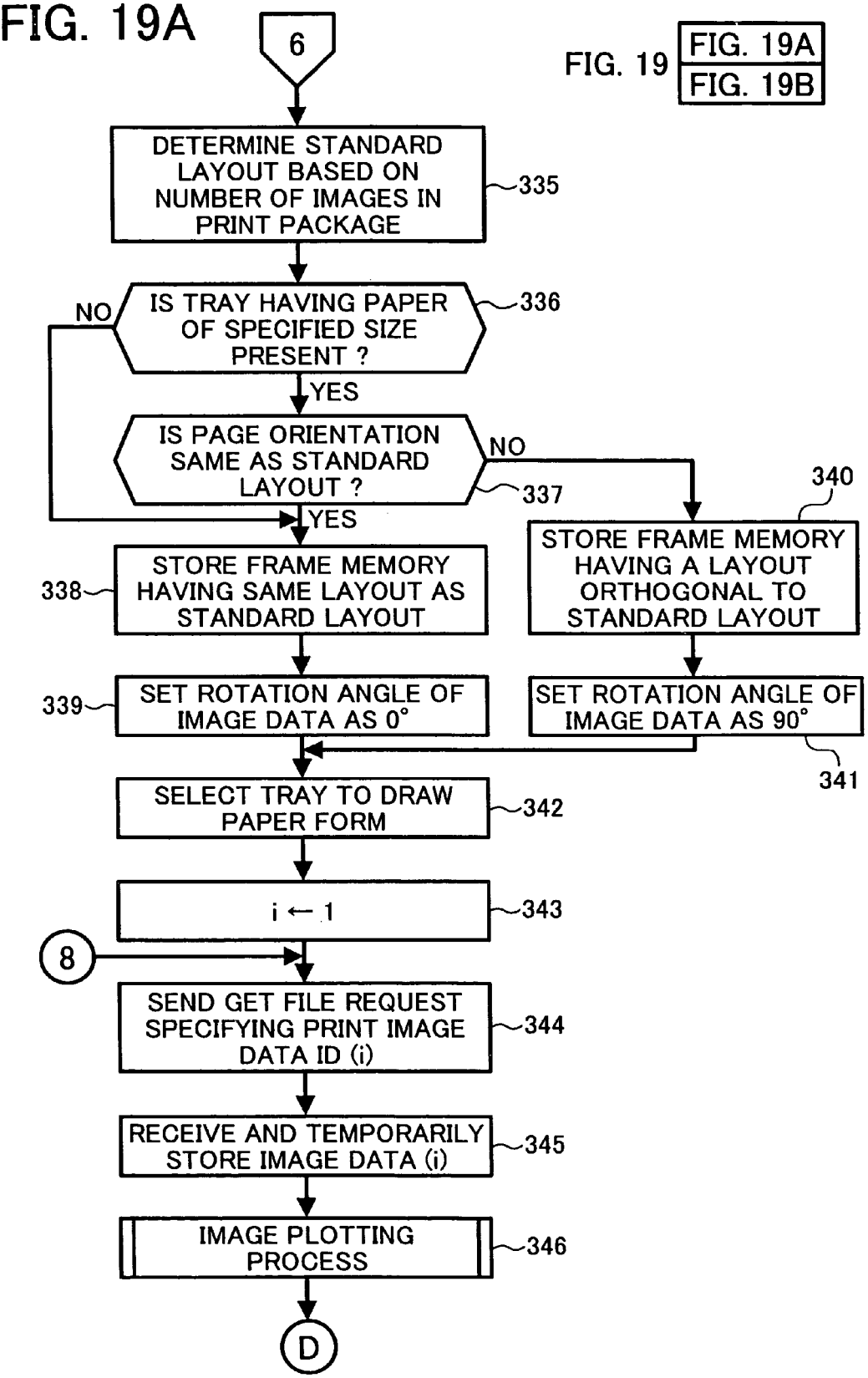

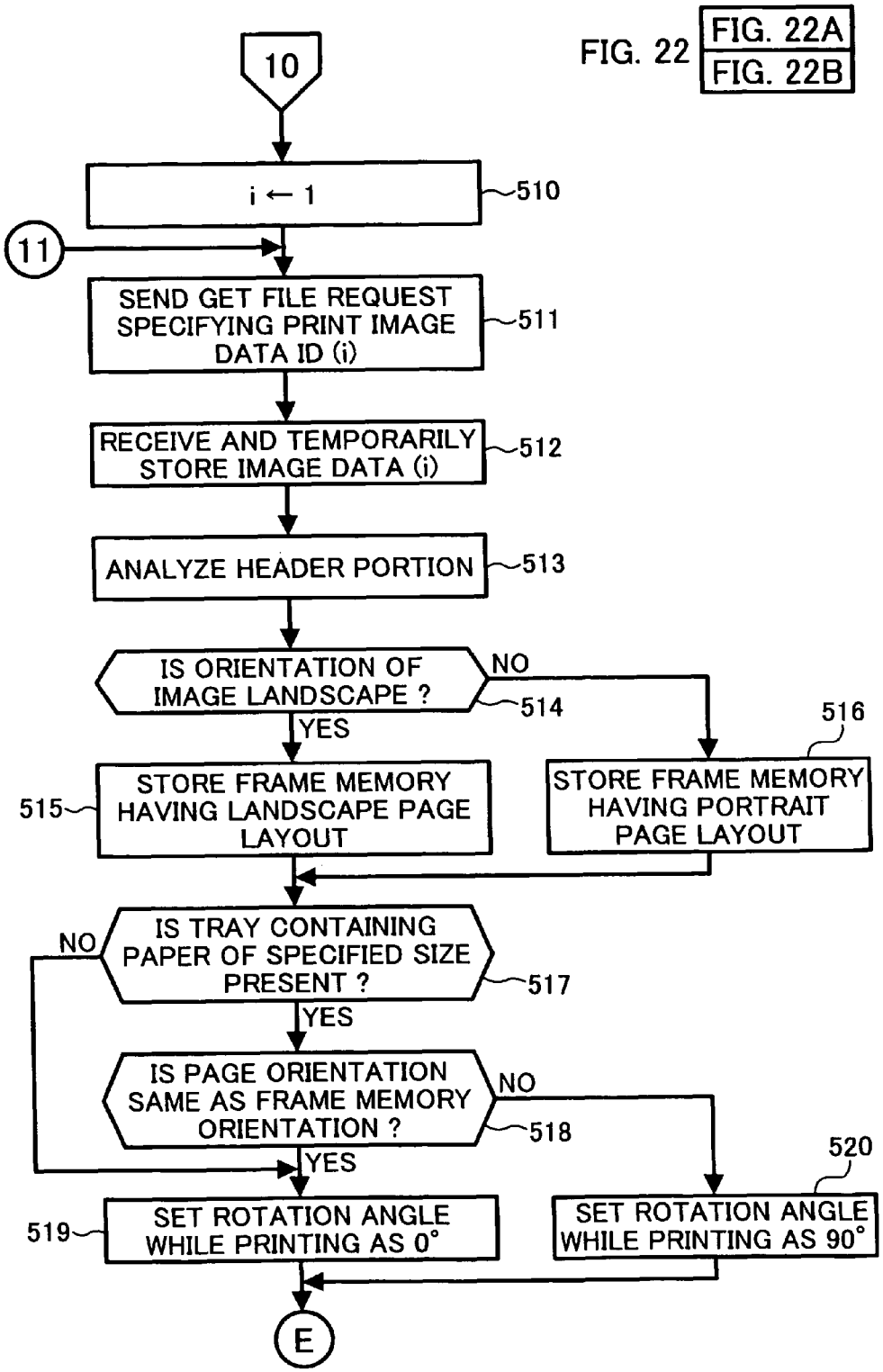

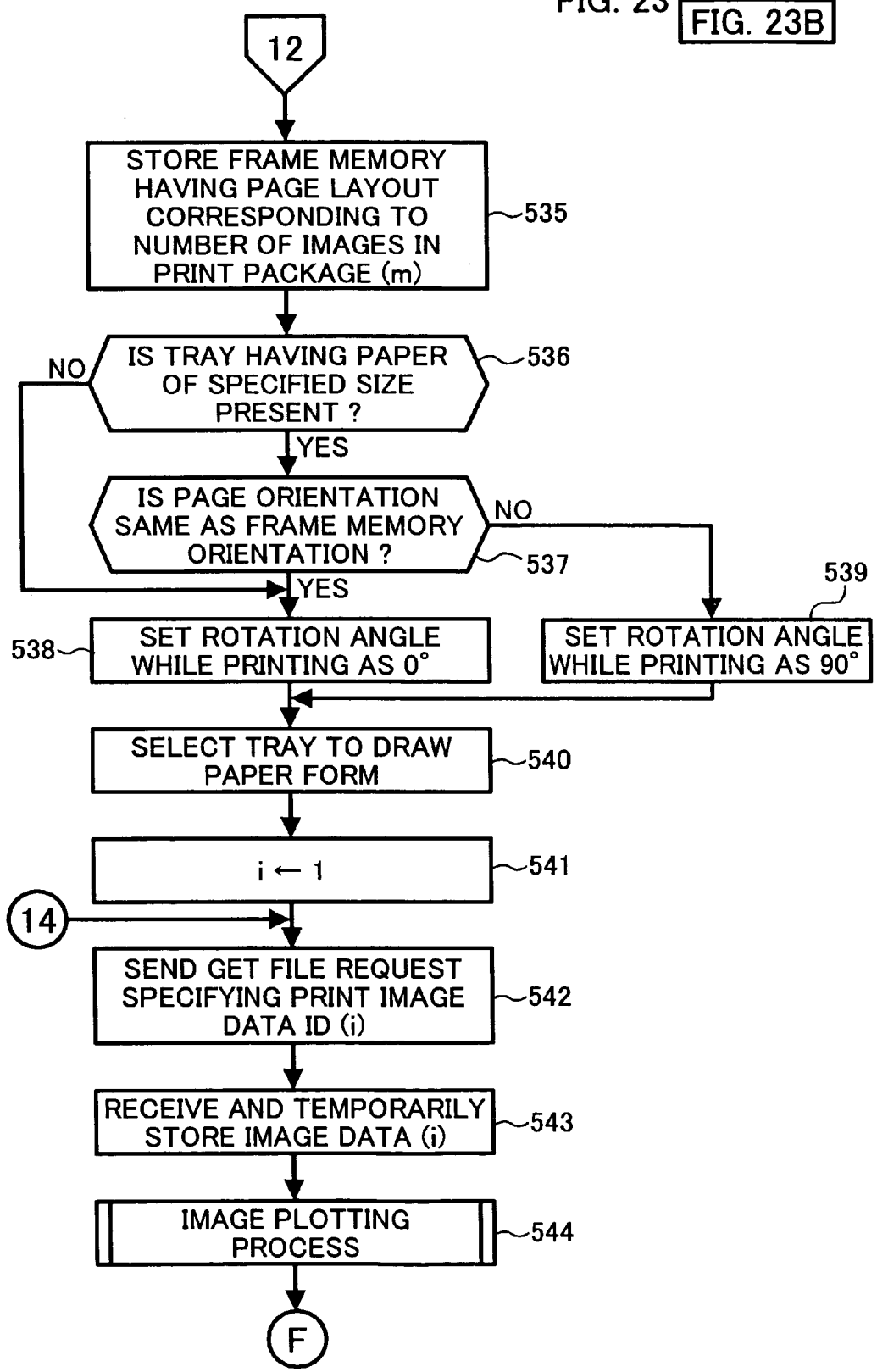

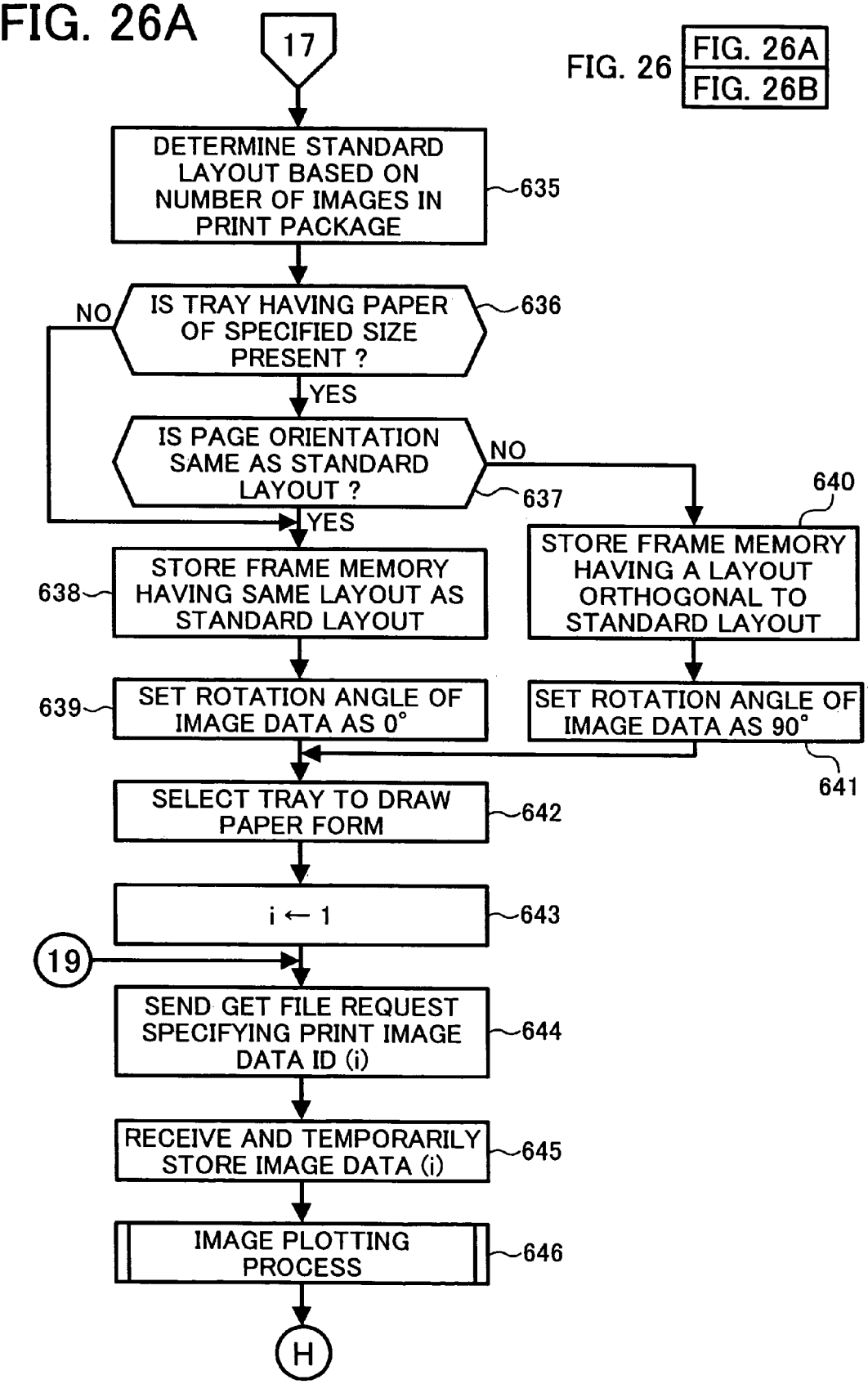

DIGITAL IMAGE PRINTING SYSTEM, CONTROL METHOD THEREFOR, PRINTING DEVICE, CONTROL METHOD THEREFOR, AND COMPUTER PRODUCT

CROSS-REFERENCE TO RELATED APPLICATIONS

The present document incorporates by reference the entire contents of Japanese priority document, 2005-020976 filed in Japan on Jan. 28, 2005.

BACKGROUND OF THE INVENTION

1. Field of the Invention

The present invention relates to a digital image printing system, a control method therefor, a printing device, a control method therefor, and a computer product.

2. Description of the Related Art

Conventionally, digital images captured by a digital still camera can be stored on a storage medium. If the digital still camera is the type that can be connected to an external data device and allows exchange of data, the digital still camera sends the digital images to the external data device, such as a personal computer. Thereafter, the digital image can be edited using the editing printing application provided in the external data device and printed using a printing device.

Alternatively, the storage medium of the digital still camera can be detached and presented at a Developing, Printing, and Enlargement (DPE) outlet to print the digital images using the printer for the digital still camera.

Thus, an external storage device is necessary to print the digital images captured by the digital still camera, making printing a complicated task.

Therefore, as a practical solution to the problem, a printing device was presented that can be directly connected to the digital still camera, acquire digital data from it, and print the digital data.

Such a printing device includes a direct printing function.

Thus, the printing device having a direct printing function could be used for easily acquiring the image data from the digital still camera and printing it.

However, the disadvantage of printing using the direct printing function is that the user can not try out various layouts, because only the display of the digital still camera and the control panel are available to him/her. Therefore, because of lack of layout options, printing only relatively simple matter is possible as compared to when an external data device is used.

Therefore, Japanese Patent Laid-Open Publication No. 2004-64740 discloses a printing device that sends printing data of the printer to the digital still camera when the camera is connected to the printer, thus increasing the compatibility between the printer and cameras of different manufacturers.

However, the printing data disclosed in Japanese Patent Laid-Open Publication No. 2004-64740 includes paper size, but does not include the orientation of the paper in the paper feeding tray.

In a laser printer or a multi function product in which a plurality of paper feeding trays are provided, the sheets of paper of the same size fed in portrait orientation (that is, in the direction orthogonal to the short edge of the paper) as well as landscape orientation (that is, in the direction orthogonal to the long edge of the paper) are set in different paper feeding trays. However, because the digital still camera does not get any information about the paper orientation, no notification about the paper orientation is sent from the digital still camera to the printing device. Consequently, the printer has to select the paper feeding tray from which to draw the paper, based on the job information including only the paper size.

In a scenario where only landscape-oriented paper is available and no portrait-oriented paper is available in the paper feeding tray, if a control process instructs the printer to always draw paper only from portrait-oriented paper feeding tray, the portrait-oriented paper may not be drawn, even if it is the appropriate orientation for the image in question. Alternatively, the image data having a portrait layout may be forced to be output in a landscape layout, resulting in partial loss of image in the printed matter.

SUMMARY OF THE INVENTION

It is an object of the present invention to at least solve the problems in the conventional technology.

According to one aspect of the present invention, a digital image printing system includes an external device capable of storing digital image data; and a printing apparatus capable of printing the digital image data received from the external device, and that includes a paper feeding unit having a multi-tray structure, where the external device and the printing apparatus are mutually connectable, and capable of exchanging data, the external device sends parameters, that is, paper size, page layout of the digital image data, and at least one digital image data to the printing apparatus, and the printing apparatus selects a tray from the paper feeding unit based on the parameters, and an aspect ratio of the digital image data.

According to another aspect of the present invention, a printing apparatus capable of connecting to and exchanging data with an external device, and printing digital image data received from the external device, includes a paper feeding unit having a multi-tray structure, where upon receiving parameters, that is, paper size, page layout, and at least one digital image data from the external device, the printing apparatus selects a tray from the paper feeding unit based on the parameters, and an aspect ratio of the digital image data.

According to still another aspect of the present invention, a method for controlling a digital image printing system that includes an external device capable of storing digital image data, and a printing apparatus capable of printing the digital image data from the external device and that includes a paper feeding unit having a multi-tray structure, the external device and the printing apparatus being mutually connectable and capable of exchanging data, the method includes sending parameters, that is, paper size, page layout of the digital image data, and at least one digital image data from the external device to the printing apparatus; and selecting, performed by the printing apparatus, a tray from the paper feeding unit based on the parameters, and the aspect ratio of the digital image data; and printing, performed by the printing apparatus, the digital image data on a paper from selected tray.

According to still another aspect of the present invention, a method for controlling a printing apparatus capable of connecting to and exchanging data with an external device, the printing apparatus including a paper feeding unit having a multi-tray structure, the method including receiving parameters, that is, paper size, page layout, and at least one digital image data from the external device; selecting a tray from the paper feeding unit based on the parameters, and an aspect ratio of the digital image data; and printing the digital image data on a paper from selected tray.

According to still another aspect of the present invention, a computer-readable recording medium that records thereon a computer program for controlling a printing apparatus capable of connecting to and exchanging data with an external device, the printing apparatus including a paper feeding unit having a multi-tray structure, the computer program including instructions which when executed, make the computer execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is an example of a print package table;

DETAILED DESCRIPTION OF THE PREFERRED EMBODIMENTS

Exemplary embodiments of the present invention are explained in detail below with reference to the accompanying drawings.

Figure 1A:
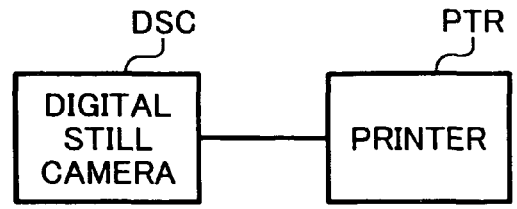
FIG. 1A and FIG. 1B are block diagrams of an example of a digital still camera printing system according to a first embodiment of the present invention.

FIG. 1A is a block diagram of an example of a digital still camera printing system according to a first embodiment of the present invention. As shown in FIG. 1A, a digital still camera DSC is connected as an external device to a printer PTR.

Apart from storing the captured digital image data in a memory card (a storage medium), the digital still camera DSC is provided with a function of connecting with the printer PTR, and sending to the printer PTR, information such as print paper size, image layout, selected image data, etc., according to a designated communication process.

Upon receiving the information from the digital still camera DSC, the printer PTR selects the paper feeding tray according to the paper size and the image layout, and gives print outputs of the selected image data on the papers drawn from the paper feeding tray.

The digital still camera DSC is provided with an external communication unit for connecting as an external device to the printer PTR and for exchanging data. Universal Serial Bus (USB) is one such commonly used external communication unit.

Figure 1B:
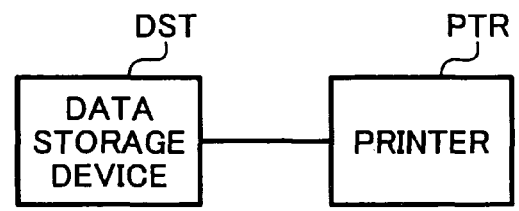

Alternatively, as shown in FIG. 1B, instead of the digital still camera DSC, a data storage device DST can be connected to the printer PTR, and print output of the images stored on the data storage device DST can be taken using the printer PTR.

The data storage device DST is provided with the function of connecting with the printer PTR, and sending to the printer PTR, information such as print paper size, image layout, selected image data, etc., according to a designated communication process.

Figure 2:
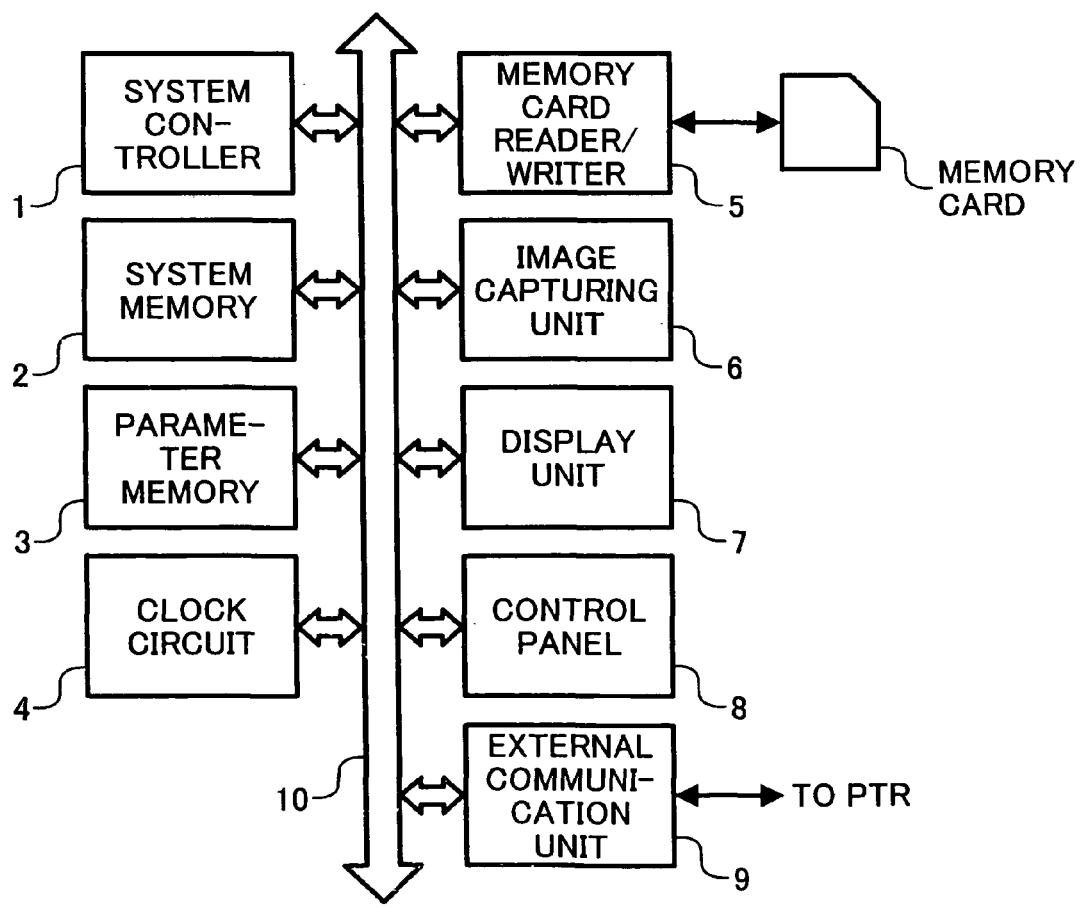
FIG. 2 is one example of a structure of a digital still camera.

FIG. 2 is one example of a structure of the digital still camera.

As shown in FIG. 2, a system controller 1 controls the operation of all the units of the digital still camera DSC, reading data from and writing data to a memory card MC, capturing, communication with an external device via an external communication unit 9, and carries out data processing such as various user interface processes related to the operation of the digital still camera DSC by a user. A system memory 2 stores various control programs required by the system controller 1 to carry out its functions, and also acts as a work area for the system controller 1. A parameter memory 3 stores various types of data specific to the digital still camera DSC. A clock circuit 4 outputs current date information.

A memory card reader/writer 5 is a drive into which the memory card MC is inserted, and which reads data from and writes data to the memory card MC. An image capturing unit 6 includes a camera mechanism, an optical system, and a photoelectric converting unit for capturing images. A display unit 7 displays various data and, for instance, may be a liquid crystal display. A control panel 8 consists of various keys by which the user can operate the digital still camera DSC.

The external communication unit 9 consists of the common USB through which the digital still camera DSC connects to the external device such as the printer PTR or the data storage device DST and exchanges data with it.

A bus 10 internally connects the system controller 1, the system memory 2, the parameter memory 3, the clock circuit 4, the memory card reader/writer 5, the image capturing unit 6, the display unit 7, the control panel 8, and the external communication unit 9. Data exchange among these parts mainly takes place via the bus 10.

Figure 3:
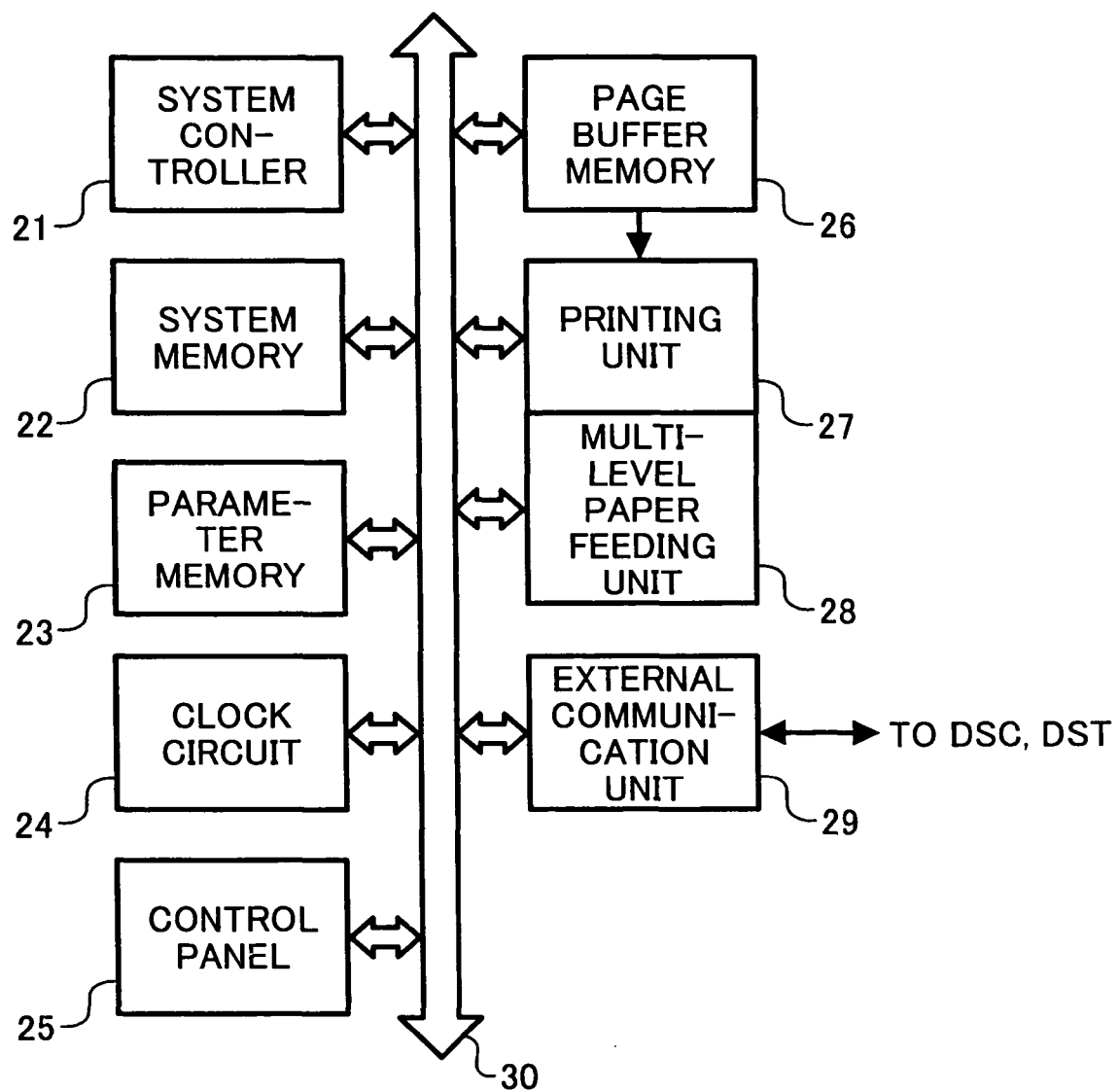
FIG. 3 is a block diagram of a printer.

FIG. 3 is a block diagram of the printer PTR. The printer PTR includes a multi-level paper feeding unit having a plurality of trays containing sheets of paper.

As shown in FIG. 3, a system controller 21 controls the operation of all the units of the printer PTR, feeding paper, printing, communication with an external device via an external communication unit 29, and carries out data processing such as various user interface processes related to the operation of the printer PTR by the user. A system memory 22 stores various control programs required by the system controller 21 to carry out its functions, and also acts as a work area for the system controller 21. A parameter memory 23 stores various types of data specific to the printer PTR. A clock circuit 24 outputs the current date information. A control panel 25 forms a user interface by which the user can operate the printer PTR.

A page buffer memory 26 is used for building a frame memory for storing print data corresponding to a single page. A printing unit 27 reads the print data from the frame memory in the page buffer memory 26, and prints the image on the paper. The printing unit 27 includes a multi-level paper feeding unit 28 having a plurality of trays containing sheets of paper. A paper of appropriate size and orientation can be selected and used by the printing unit 27. The various types of paper in the trays include A4 portrait, A4 landscape, B5 portrait, B5 landscape, A3 portrait, etc.

The external communication unit 29 consists of the common USB through which the printer PTR connects to the external device such as the digital still camera DSC or the data storage device DST and exchanges data with it.

A bus 30 internally connects the system controller 21, the system memory 22, the parameter memory 23, the clock circuit 24, the control panel 25, the page buffer memory 26, the printing unit 27, the multi-level paper feeding unit 28, and the external communication unit 29. Data exchange among these parts mainly takes place via the bus 30.

Figure 4:
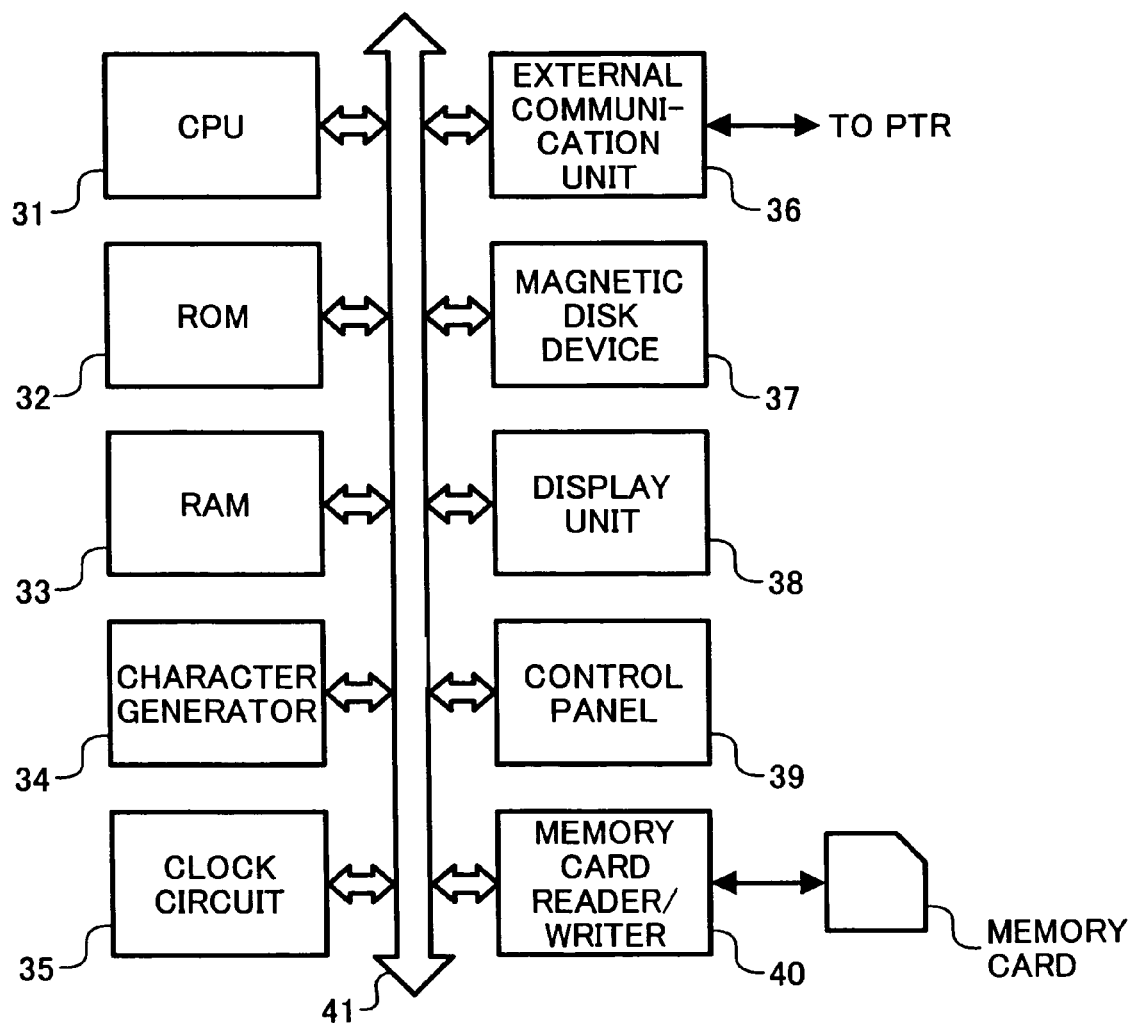
FIG. 4 is a block diagram of a data storage device.

FIG. 4 is a block diagram of the data storage device DST. The data storage device DST reads and stores a number of image data from the memory card, and is equipped with the function of displaying the stored image data and sending the image data to the external device.

As shown in FIG. 4, a central processing unit (CPU) 31 controls the operation of the data storage device DST. A read-only memory (ROM) 32 contains programs run by the CPU 31, necessary data, etc. A random access memory (RAM) 33 forms a work area for the CPU 31.

A character generator 34 generates display data of graphic characters. A clock circuit 35 outputs the current date information. An external communication unit 36 consists of the common USB through which the data storage device DST connects to the external device such as the printer PTR and exchanges data with it.

A magnetic disk device 37 stores various types of data such as a number of image data, etc. A display unit 38 displays various data, and for instance, may be a liquid crystal display. A control panel 39 consists of various keys by which the user can operate the data storage device DST. A memory card reader/writer 40 is a drive into which the memory card MC is inserted, and which reads data from and writes data to the memory card MC.

A bus 41 internally connects the CPU 31, the ROM 32, the RAM 33, the character generator 34, the clock circuit 35, the external communication unit 36, the magnetic disk device 37, the display unit 38, the control panel 39, and the memory card reader/writer 40. Data exchange among these parts mainly takes place via the bus 41.

A mobile communication terminal device (such as a mobile phone, etc.) can be provided with the functions of the digital still camera DSC or data storage device DST, and may be used as a digital still camera or data storage device DST. Alternatively, a digital video camera that includes the functions of a digital still camera can be used.

Figure 5:
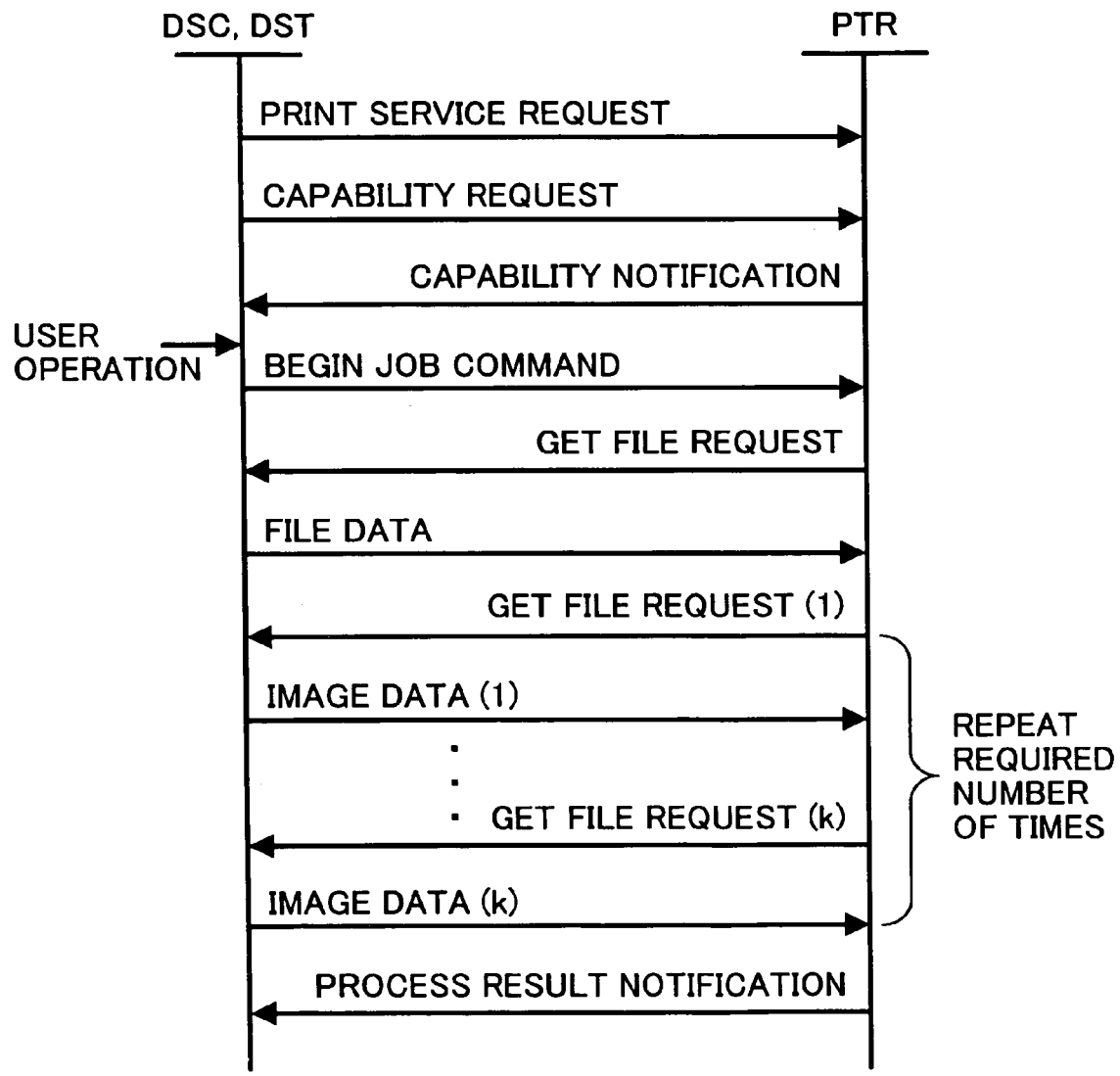
FIG. 5 is a time chart of an example of a communication procedure that takes place when the digital still camera or the data storage device gives a print command to the printer.

FIG. 5 is a time chart of an example of a communication procedure that takes place when the digital still camera DSC or the data storage device DST gives a print command to the printer PTR.

The user first connects the digital still camera DSC or the data storage device DST with the printer PTR via the USB cable, and gives a "Print service request" command to the digital still camera DSC or the data storage device DST.

The digital still camera DSC or the data storage device DST sends the "Print service request" command to the printer PTR, followed by a "Capability request" command.

Upon receiving the "Capability request" command, the printer PTR sends a "Capability notification" response, which includes capability data of the printer PTR that can be specified when giving a printing instruction.

The capability data includes print quality (Draft/Standard/High quality, etc.), paper size, acceptable image format, date output, number of images in a print package, etc. "Number of images in a print package" refers to a print package layout selection specifying the number of frames (images) in a print package.

Using the digital still camera DSC or the data storage device DST, the user can input the printing conditions (print quality, paper size, disable/enable date output, print package, etc.) based on the capability data sent by the printer PTR, as well as select the image to be printed.

Figure 6A:
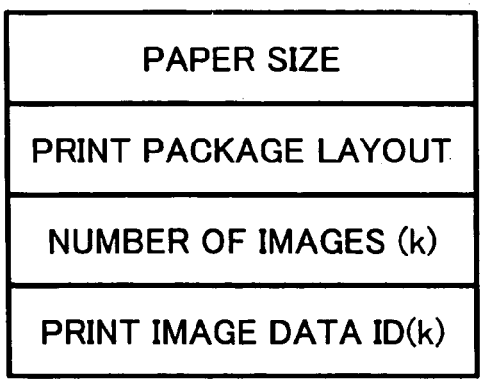
FIG. 6A and FIG. 6C are example formats of print job data.
Figure 6B:
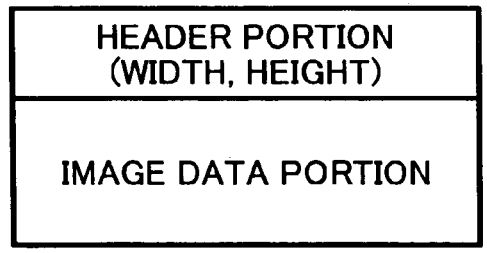
FIG. 6B is an example format of image data.

Once the user has input the necessary requirements, the digital still camera DSC or the data storage device DST sends a "Begin job" command, which includes print job data as shown in FIG. 6A.

The printer PTR sends to the digital still camera DSC or the data storage device DST as many "Get file request" responses as there are print image data IDs in the received print job data, specifying one print image data ID in each response.

Upon receiving the "Get file request" responses from the printer PTR, the digital still camera DSC or the data storage device DST sends the image data corresponding to the print image data ID one by one to the printer PTR.

The printer PTR creates print data based on the received image data, and carries out printing as per the requirement. The image data is usually encoded in one or the other image format. The printer PTR decodes the image data and creates an RGB image data, for instance, and converts the RGB image data into print data. The printer appropriately resizes the image, taking into consideration the size of the image data (resolution and number of pixels) and the paper size or the print area size.

Upon completing all the print jobs,.the printer PTR sends a "Process result notification" response, notifying the result to the digital still camera DSC or the data storage device DST.

Upon receiving the "process result notification" response from the printer PTR, the digital still camera DSC or the data storage device DST ends the print job.

In the above communication protocol, the print job data includes the field print image count. However, even if the print image count is omitted, the printer PTR totals the number of print image data ID in the print job data and determines the print image count.

The print package layout is explained next. The printer PTR has a plurality of preset print package layouts. FIG. 7 is an example of a print package table containing information pertaining to the number of images in the print package and the page orientation. The print package table is stored in the system memory 22.

Seven preset print package layouts having 2, 4, 8, 9, 16, 25, and 32 frames per page are available. The field "Page orientation" specifies the orientation of the page of frame memory formed in the page buffer memory corresponding to the selected print package.

Two types of page orientation are possible, namely, "Portrait" and "Landscape". FIG. 8 through FIG. 11 are drawings illustrating the page orientation corresponding to each print package layout.

In the present embodiment, when implementing print package layout, when an image data is resized, its aspect ratio (the ratio of X-axis to Y-axis) is preserved and the image data is stored in the frame memory in the same orientation as the original image data. Further, when the image data is scaled down, the entire image data fits within the print area.

Figure 12A:
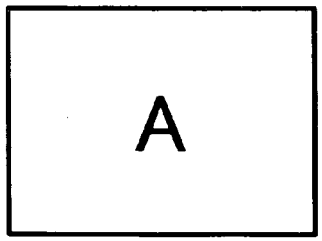
FIG. 12A through FIG. 12F are drawings to explain a rotation of an image data.
Figure 12B:
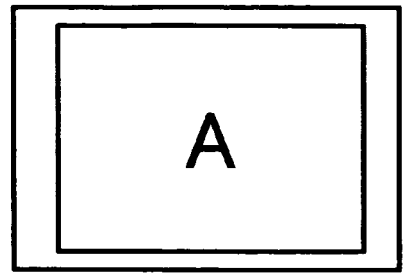

Incidentally, when one image data is to be printed on one page and the orientation of the image data is landscape, as shown in FIG. 12A, the orientation of the printed matter has to necessarily be landscape (also known as Long Edge Feed (LEF)), as shown in FIG. 12B.

Figure 12C:
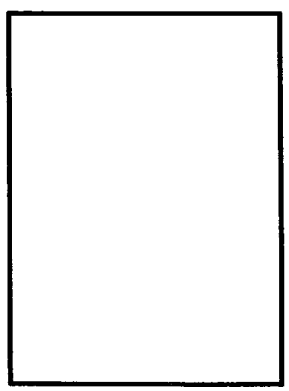
Figure 12D:
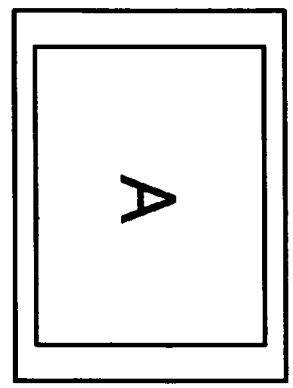

However, if the paper in the paper feeding tray is of the required size but its orientation is portrait (also known as Short Edge Feed (SEF)), as shown FIG. 12C, the image needs to be rotated and fitted on the paper to obtain printed matter, as shown in FIG. 12D.

Figure 12E:
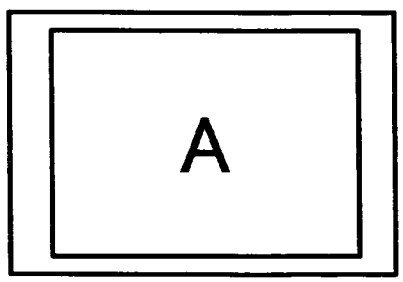
Figure 12F:
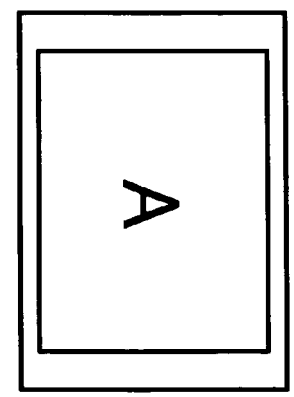

Two methods are available for rotating the image. In the first method, as shown in FIG. 12E, a frame memory having the same orientation as the image data is formed in the page buffer memory 26, the printing unit 27 prints the image data after performing a paper rotation processing.

In the second method, a frame memory having an orientation that is orthogonal to the orientation of the image data is formed in the page buffer memory 26, the image data is rotated when storing in the frame memory, and the printing unit 27 prints the image data without performing the paper rotation processing.

The first method is advantageous if hardware is provided in the printing unit 27 to rotate the paper and the second method is advantageous if the system controller 21 is powerful.

Rotation, whether carried out by the printing unit 27 or the system controller 21, involves processing significant amount of data, and therefore, increases the time required for getting a print output., To shorten the time for getting a print output, it is therefore preferable to avoid the need for rotation by selecting the paper with the correct orientation for the image data.

Therefore, in the present invention, the paper size and the orientation ("Portrait" or "Landscape") are selected, and the appropriate tray containing the paper is selected from the multi-level paper feeding unit 28.

In other words, if one image per page is specified to be printed from the digital still camera DSC or the data storage device DST, and the orientation of the image data is portrait, the tray of the multi-level paper feeding unit 28 containing the paper of the specified size and orientation is selected. If the orientation of the image data is landscape, the tray of the multi-level paper feeding unit 28 containing the paper of the specified size and orientation is selected. If the selected page layout corresponding to the specified print package layout is landscape, the tray of the multi-level paper feeding unit 28 containing the paper of the specified size and orientation is selected.

Thus, according to the present invention, even if only the paper size is specified in the digital still camera DSC or the data storage device DST, suitable paper is selected from the relevant tray. As a result, time required for the printing process can be shortened.

Figure 13:
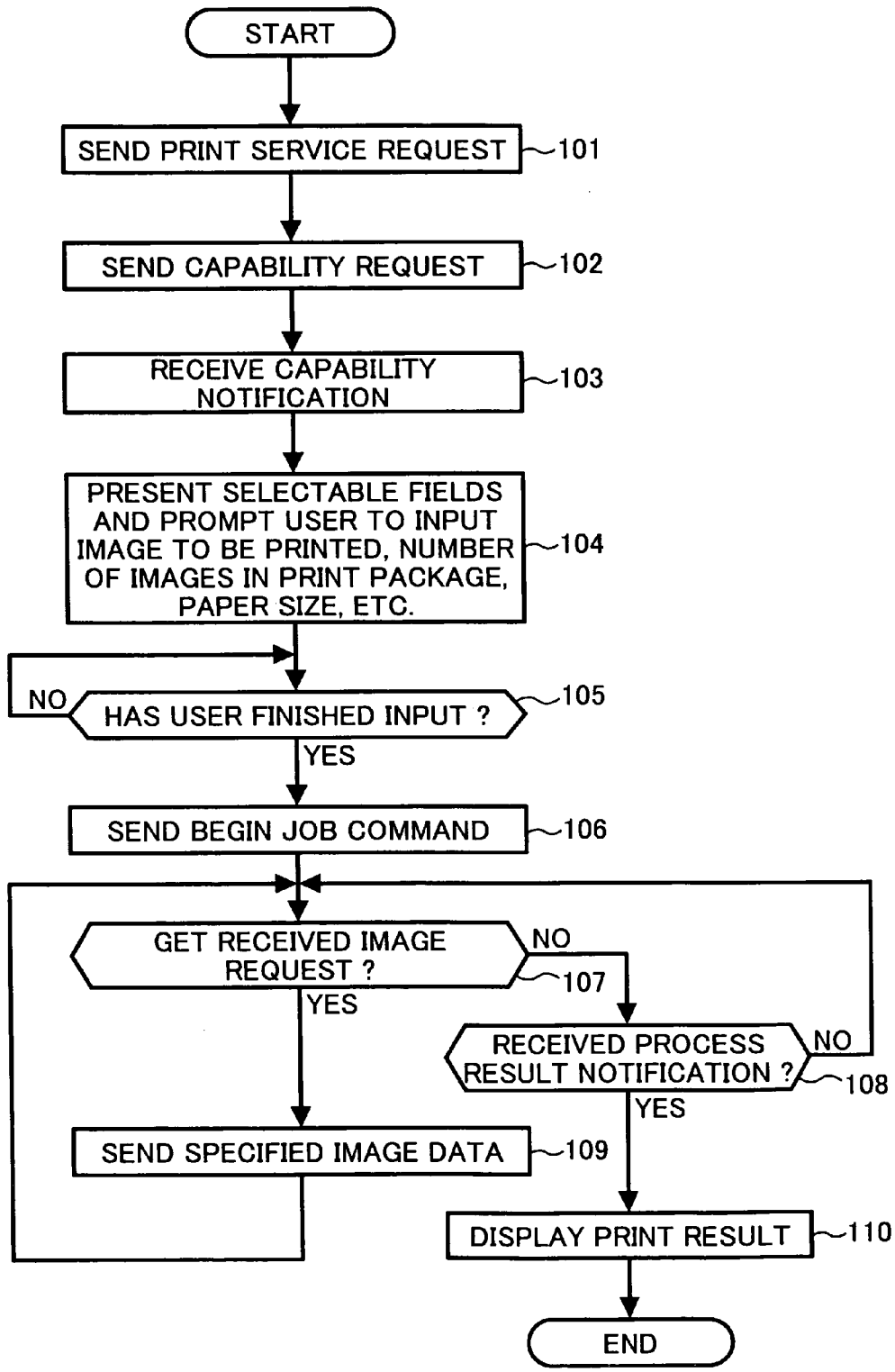
FIG. 13 is a flowchart of a process executed by the digital still camera DSC (or the data storage device DST) for sending an image data for printing to the printer PTR.

FIG. 13 is a flowchart of the process executed by the digital still camera DSC (or the data storage device DST) for sending an image data for printing to the printer PTR.

The user connects the digital still camera DSC and the printer PTR by a USB cable and gives a print command on the digital still camera DSC.

The digital still camera DSC sends a "Print service request" command to the printer PTR, followed by a "Capability request" command (processes 101 and 102).

The digital still camera (DSC) receives a "Capability notification" response from the printer PTR (process 103). Based on the capability information included in the "Capability notification" response, the digital still camera DSC prompts the user to input the printing conditions (such as, print quality, paper size, disable/enable date output, print package, etc.) and select the image for printing (process 104).

Once the user input is complete ("Yes" for Decision 105), the digital still camera DSC sends a "Begin job" command that includes print job data shown in FIG. 6A (process 106).

In response, the digital still camera DSC waits for either a "Get image request" or a "Process result notification" from the printer PTR ("No loop" of Decisions 107 and 108).

When the result of Decision 107 is "Yes" upon receiving a "Get image request" response, the digital still camera DSC reads the image data corresponding to the specified print image data ID, and sends it to the printer PTR (process 109).

When the result of Decision 108 is "Yes" upon receiving a "Process result notification" response, the digital still camera DSC outputs the print result on the display (process 110) and ends the task on hand.

Figure 14:
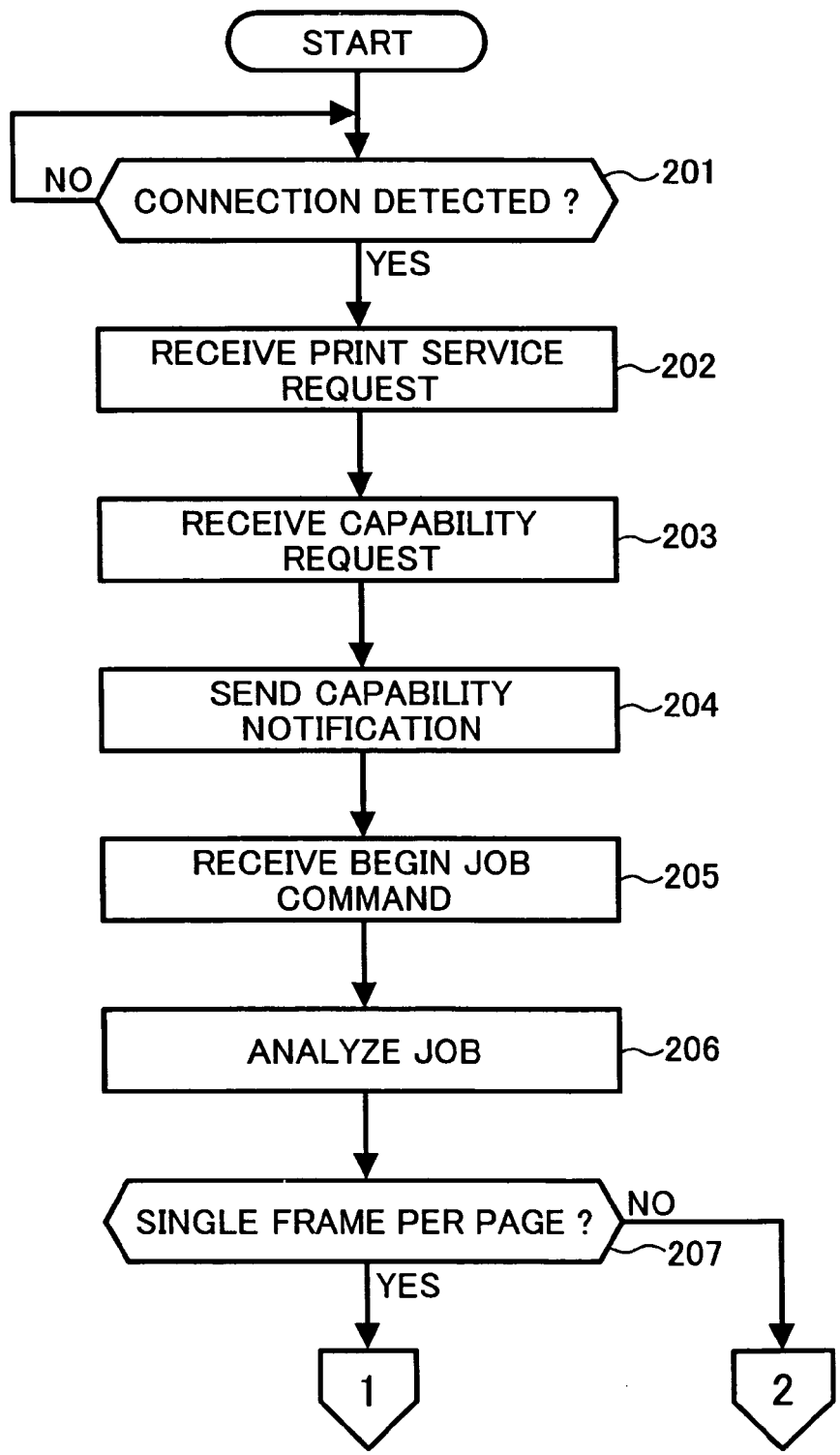
FIG. 14 is a first flowchart of an example process executed by the printer PTR upon receiving a print service request from the digital still camera or the data storage device DST.
Figure 15A:
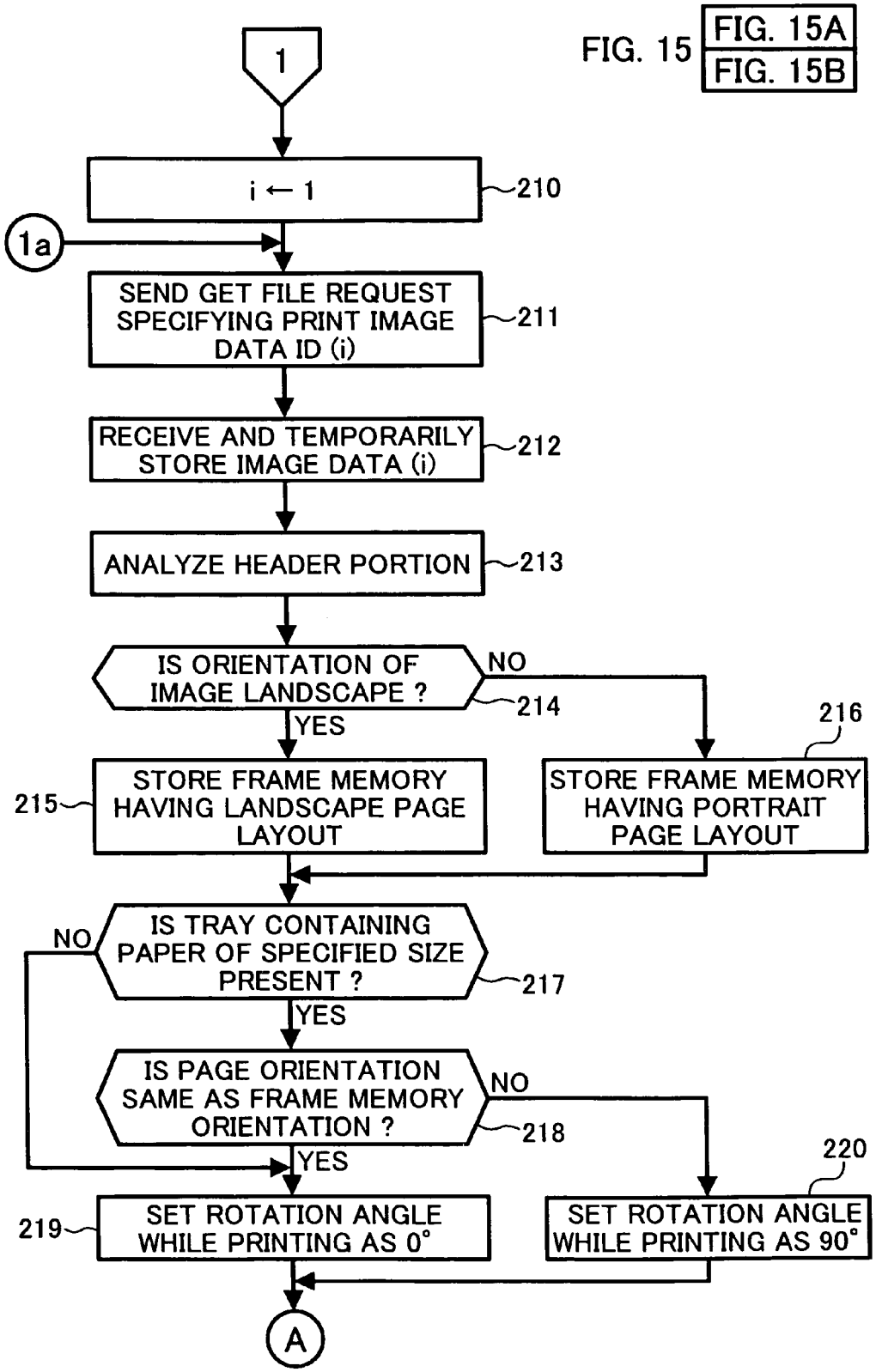
FIG. 15 is a second flowchart of the example process executed by the printer PTR upon receiving a print service request from the digital still camera or the data storage device DST.
Figure 15B:
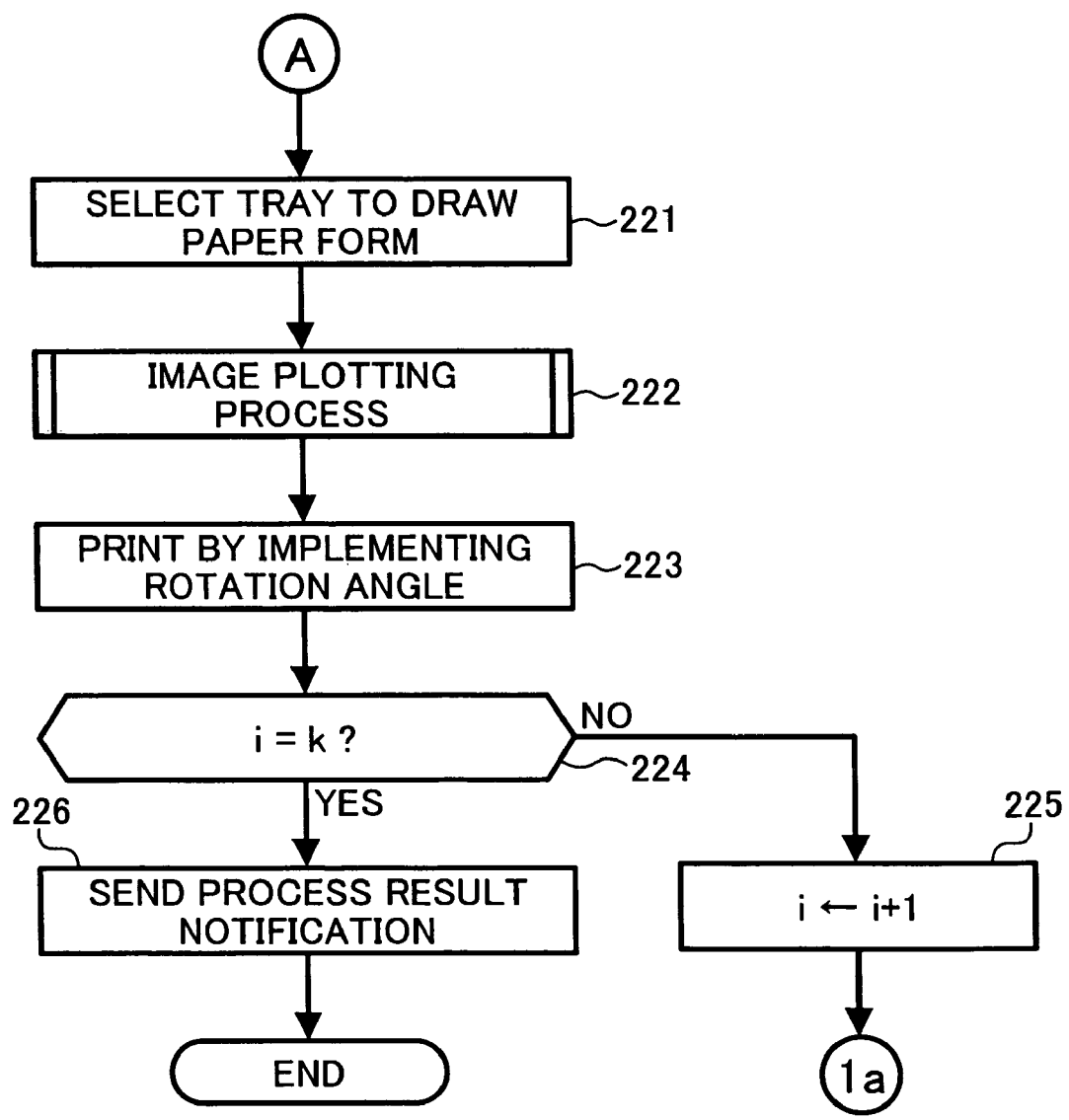
Figure 16A:
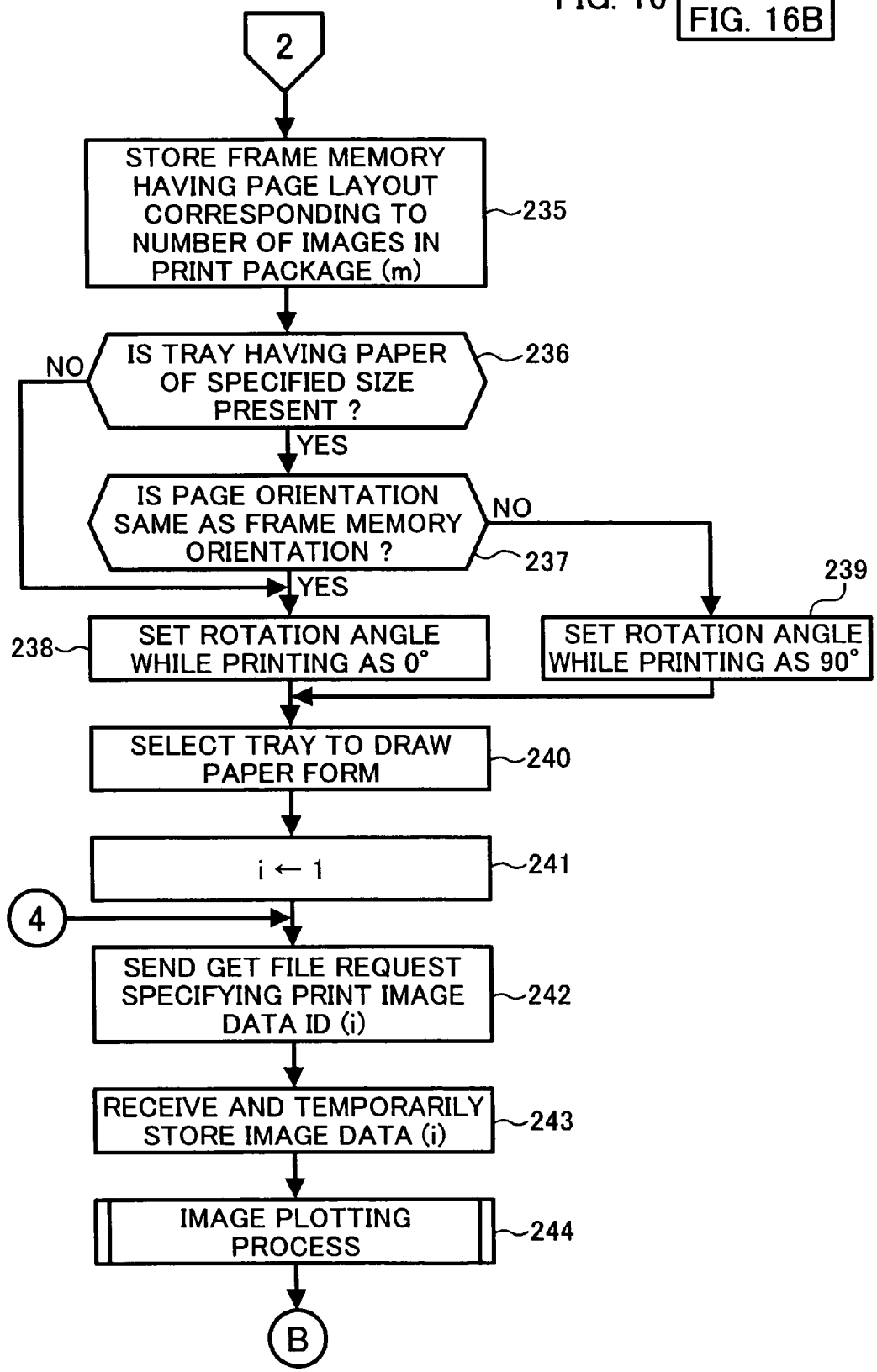
FIG. 16 is a third flowchart of the example process executed by the printer PTR upon receiving a print service request from the digital still camera or the data storage device DST.
Figure 16B:
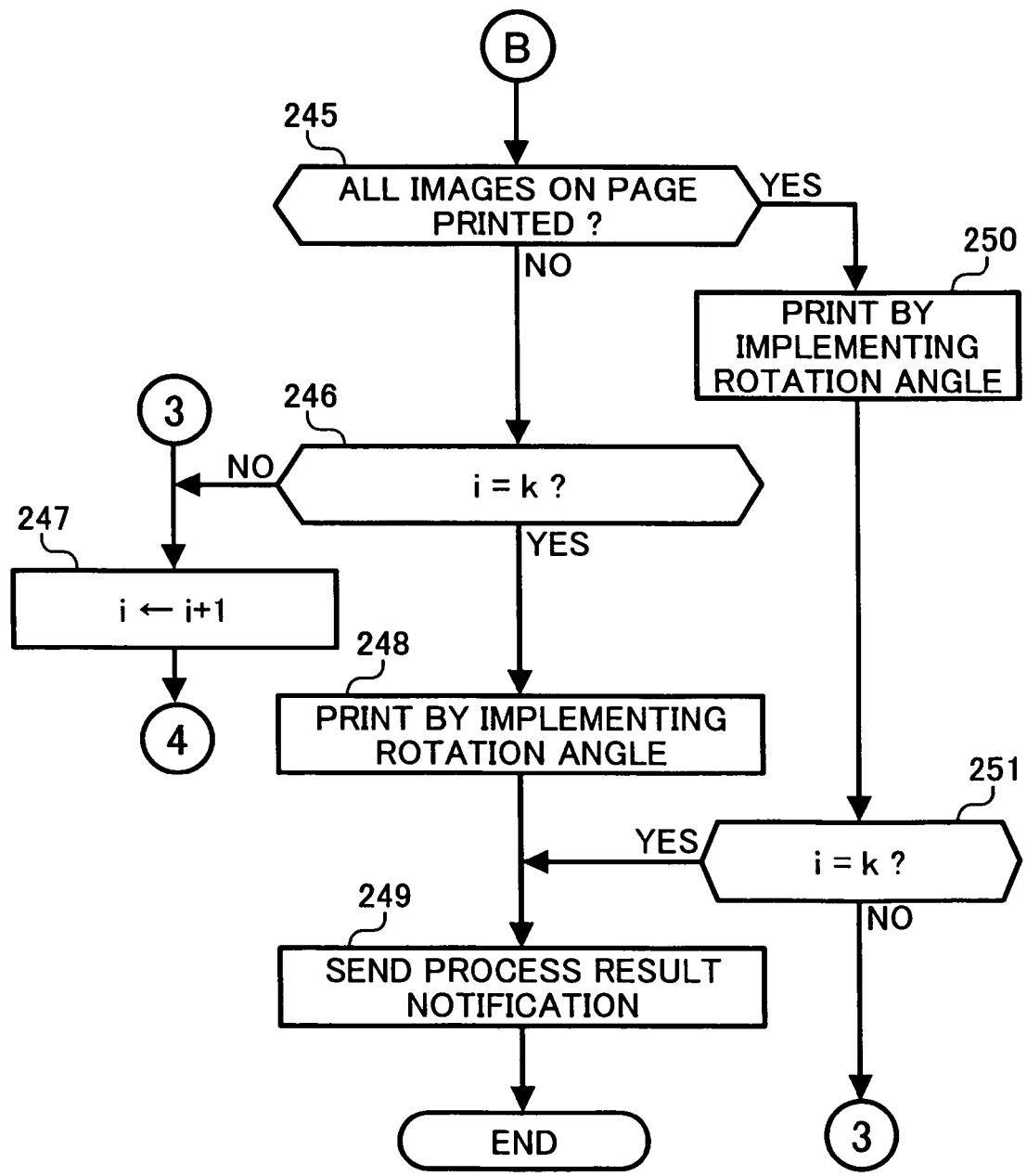

FIG. 14 through FIG. 16 are flowcharts of one example process executed by the printer PTR upon receiving a print service request from the digital still camera DSC or the data storage device DST. The rotation process function of the printing unit 27 is used for carrying out paper rotation.

If connection by the USB cable is detected ("Yes" for Decision 201), the printer PTR receives the "Print service request" command from the requesting terminal (process 202). The printer PTR receives the subsequent "Capability request" (process 203), and sends the "Capability notification" (process 204) in response.

Upon receiving the "Begin job" command (process 205), the printer PTR analyzes its contents (process 206) and checks whether the print mode specified is for one image per page ("single frame per page" mode) (Decision 207).

If the result of Decision 207 is "Yes", the printer PTR resets a counter 'i' of the number of pages to 1 (process 210) and sends a "Get file request" response specifying the i-th print image data ID (i) to the requesting terminal (process 211).

The printer PTR then receives and temporarily stores the i-th image data (i) sent by the requesting terminal (process 212), and analyzes the header portion of the image data (i) (process 213) to check whether the orientation of the image is landscape (h<w) (Decision 214). If the result of Decision 214 is "Yes", the printer PTR stores the frame memory having a landscape page layout in the page buffer memory 26 (process 215). If the result of Decision 214 is "No", the printer PTR stores the frame memory having a portrait page layout in the page buffer memory 26 (process 216).

Next, the printer PTR checks whether the tray containing the paper of the size specified in the "Begin job" command is present in the multi-level paper feeding unit 28 (Decision 217). If the result of Decision 217 is "Yes", the printer PTR checks whether the orientation (portrait or landscape) of the paper is the same as the page layout in the frame memory (Decision 218). For example, if paper size is specified as A4 and page layout as portrait, the printer PTR checks whether the tray containing A4 size SEF paper is present in the multi-level paper feeding unit 28.

If the result of Decision 218 is "Yes", the printer PTR sets the rotation angle at the time of printing as 0° (process 219). If the result of Decision 218 is "No", the printer PTR sets the rotation angle at the time of printing as 90° (process 220). If the result of Decision 217 is "No", the printer PTR advances to process 219 and sets the rotation angle at the time of printing as 0°.

The printer PTR then selects the tray of the multi-level paper feeding unit 28 from which the paper will be drawn (process 221). If the result of Decision 218 is "Yes", the printer PTR selects the tray containing paper of the specified size and having the same orientation as the page layout in the frame memory. If the result of Decision 218 is "No", the printer PTR selects the tray containing paper of the specified size and having the orientation that is orthogonal to the page layout in the frame memory. If the result of Decision 217 is "No", the printer PTR selects the tray containing paper having preset default size and orientation (for example, A4 size SEF).

The printer PTR then writes the print data corresponding to the temporarily stored image data to the frame memory that is stored in the page buffer memory 26 (image plotting process; process 222). The printer PTR prompts the printing unit 27 to carry out printing by manipulating the paper according to the rotation angle set by processes 219 or 220 (process 223). Thus, the printer PTR gives a print output of a single page.

Once the printed page is output, the printer PTR checks whether the counter i is equal to the number of images k (Decision 224). If the result of Decision 224 is "No", the printer PTR increments the value of the counter i by one to print the next image data (process 225) and returns to process 211.

Once all the image data have been printed, and the result of Decision 224 is "Yes", the printer PTR creates information pertaining to the print result for that round of printing, includes the print result in the "Process result notification" response, and sends it to the requesting terminal (process 226).

If print package layout is specified, and the result of Decision 207 is "No", the printer PTR looks up the package table, gets the page layout ("Portrait" or "Landscape") corresponding to the number of images in the print package (m), and stores the frame memory having the relevant page layout in the page buffer memory 26 (process 235).

Next, the printer PTR checks whether the tray containing the paper of the size specified in the "Begin job" command is present in the multi-level paper feeding unit 28 (Decision 236). If the result of Decision 236 is "Yes", the printer PTR checks whether the orientation of the paper (portrait or landscape) is the same as the page layout in the frame memory (Decision 237). For example, if paper size is specified as A4 and page layout as portrait, the printer PTR checks whether the tray containing A4 size SEF paper is present in the multi-level paper feeding unit 28.

If the result of Decision 237 is "Yes", the printer PTR sets the rotation angle at the time of printing as 0° (process 238). If the result of Decision 237 is "No", the printer PTR sets the rotation angle at the time of printing as 90° (process 239). If the result of Decision 236 is "No", the printer PTR advances to process 238 and sets the rotation angle at the time of printing as 0°.

The printer PTR then selects the tray of the multi-level paper feeding unit 28 from which the paper will be drawn (process 240). If the result of Decision 237 is "Yes", the printer PTR selects the tray containing paper of the specified size and having the same orientation as the page layout in the frame memory. If the result of Decision 237 is "No", the printer PTR selects the tray containing paper of the specified size and having the orientation that is orthogonal to the page layout in the frame memory. If the result of Decision 236 is "No", the printer PTR selects the tray containing paper having preset default size and orientation (for example, A4 size SEF).

After selecting the tray, the printer PTR resets the counter i, which counts the number of images to be printed (process 241), to 1, specifies i-th print image data ID (i) in the "Get file request" response, and sends it to the requesting terminal (process 242).

The printer PTR then receives and temporarily stores the i-th image data (i) sent by the requesting terminal (process 243), and writes the print data corresponding to the temporarily stored image data to the frame memory stored in the page buffer memory 26 (image plotting process; process 244).

The printer PTR checks whether print data corresponding to all the images to be printed on one page are written to the frame memory (Decision 245). If the result of Decision 245 is "No", the printer checks whether the value of the counter i is equal to the number of images per page k (Decision 246).

If the result of Decision 246 is "No", the printer PTR increments the value of the counter i by one to place the print data in the empty image area of the page (process 247), and returns to process 242. If the result of Decision 246 is "Yes", the printer PTR prompts the printing unit 27 to carry out printing by manipulating the paper according to the rotation angle set by processes 238 or 239 (process 248). Thus, the printer PTR gives a print output of a single page.

Once all the image data have been printed, the printer PTR creates information pertaining to the print result for that round of printing, includes the print result in the "Process result notification" response, and sends it to the requesting terminal (process 249).

If the result of Decision 245 is "Yes", the printer PTR prompts the printing unit 27 to carry out printing by manipulating the paper according to the rotation angle set by processes 238 or 239 (process 250). Thus, the printer PTR gives a print output of a single page.

Next, the printer PTR checks whether the value of the counter i is equal to the number of images per page k (Decision 251). If the result of Decision 251 is "No", the printer PTR performs process 247 and increments the value of the counter i by one to print the next page.

If the result of Decision 251 is "Yes", the printer PTR performs process 249 and creates information pertaining to the print result for that round of printing, includes the print result in the "Process result notification" response, and sends it to the requesting terminal.

Figure 17:
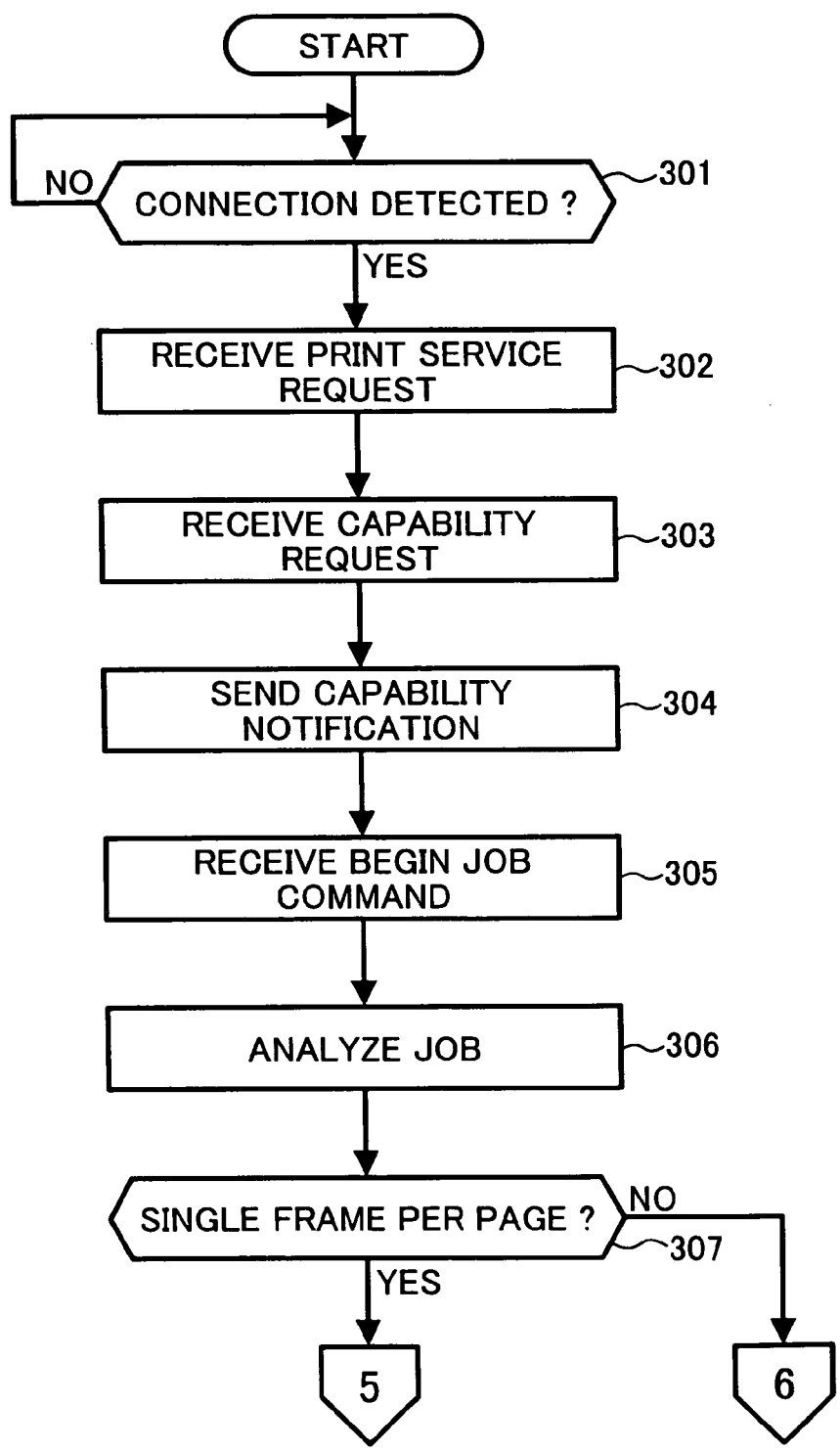
FIG. 17 is a first flowchart of a second example process executed by the printer PTR upon receiving a print service request from the digital still camera or the data storage device DST.
Figure 18B:
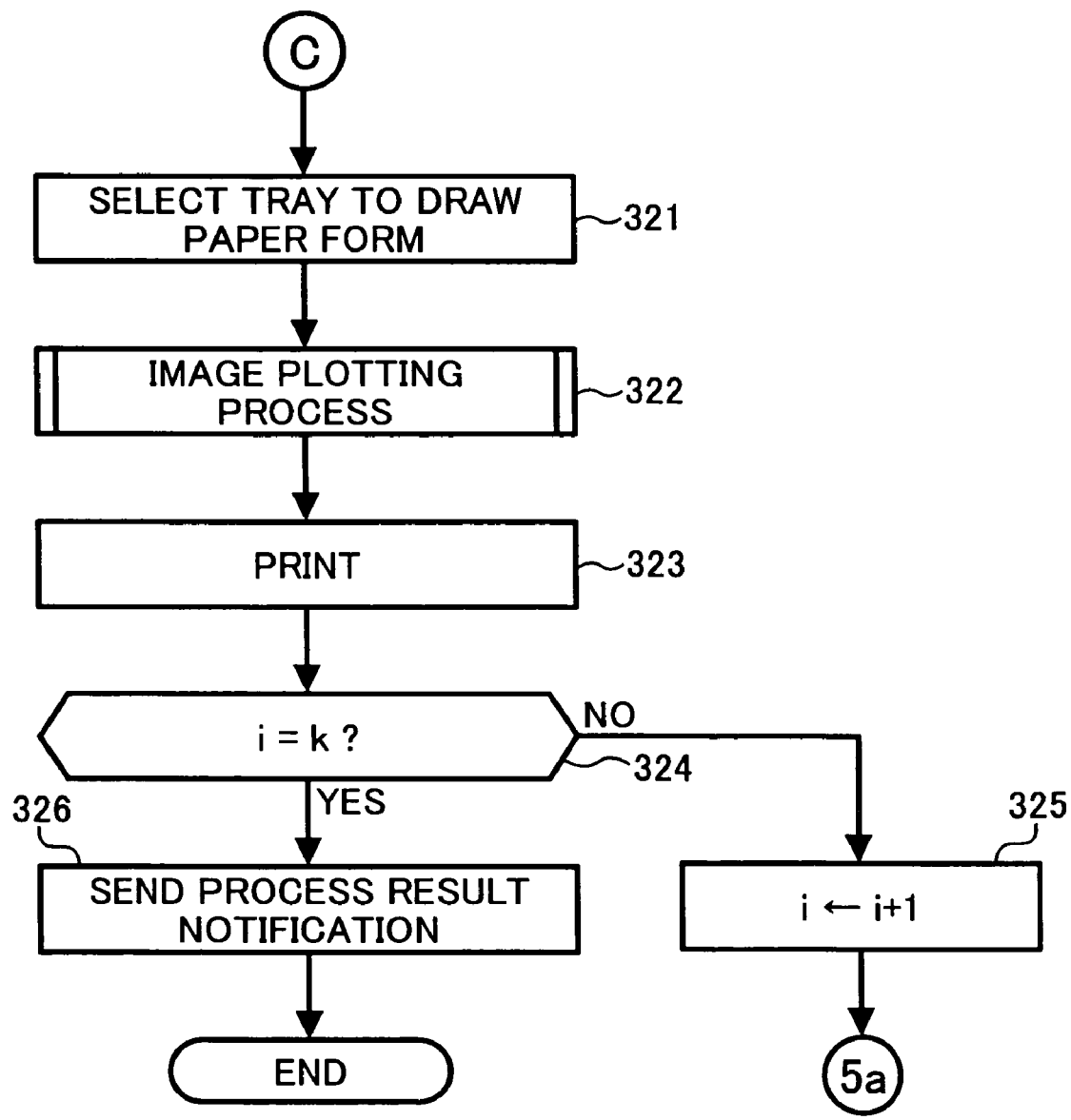
FIG. 18 is a second flowchart of the second example process executed by the printer PTR upon receiving a print service request from the digital still camera or the data storage device DST.
Figure 19B:
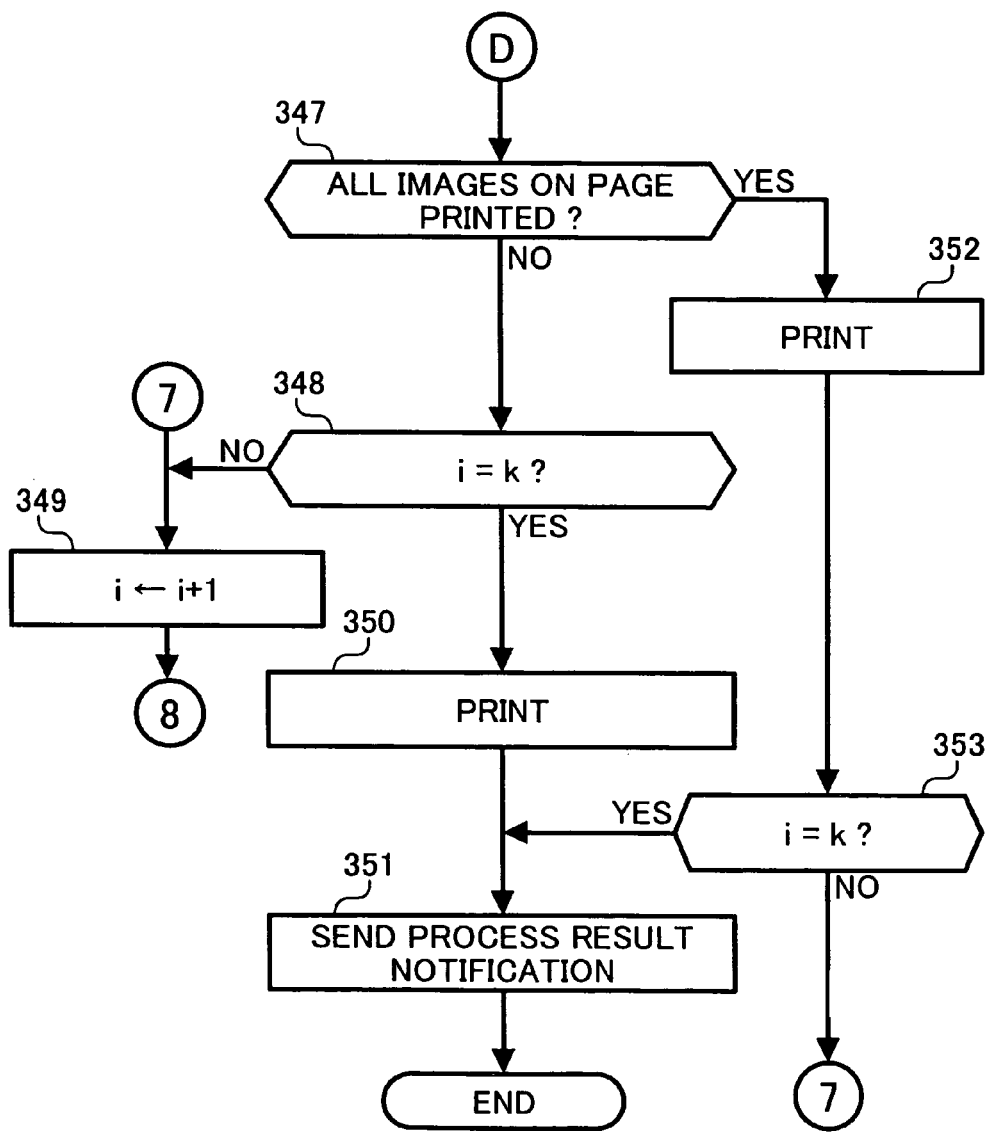
FIG. 19 is a third flowchart of the second example process executed by the printer PTR upon receiving a print service request from the digital still camera or the data storage device DST.

FIG. 17 through FIG. 19 are flowcharts of a second example process executed by the printer PTR upon receiving a print service request from the digital still camera DSC or the data storage device DST. In this instance, the rotation process function of the system controller 21 is used for carrying out paper rotation.

If connection by the USB cable is detected ("Yes" for Decision 301), the printer PTR receives the "Print service request" command from the requesting terminal (process 302). The printer PTR receives the subsequent "Capability request" (process 303), and sends the "Capability notification" (process 304) in response.

Upon receiving the "Begin job" command (process 305), the printer PTR analyzes its contents (process 306) and checks whether the print mode specified is for one image per page ("single frame per page" mode) (Decision 307).

If the result of Decision 307 is "Yes", the printer PTR resets a counter i of the number of pages to 1 (process 310) and sends a "Get file request" response specifying the i-th print image data ID (i) to the requesting terminal (process 31 1).

The printer PTR then receives and temporarily stores the i-th image data (i) sent by the requesting terminal (process 312), and analyzes the header portion of the image data (i) (process 313) to check whether the orientation of the image is landscape (h<w) (Decision 314).

Next, the printer PTR checks whether the tray containing the paper of the size specified in the "Begin job" command is present in the multi-level paper feeding unit 28 (Decision 315). If the result of Decision 315 is "Yes", the printer PTR checks whether the orientation (portrait or landscape) of the paper is the same as the page layout in the frame memory (Decision 316). For example, if paper size is specified as A4 and page layout as portrait, the printer PTR checks whether the tray containing A4 size SEF paper is present in the multi-level paper feeding unit 28.

If the result of Decision 316 is "Yes", the printer PTR stores the frame memory having the same orientation as the image in the page buffer memory 26 (process 317), and sets the rotation angle of the image data as 0° (process 318). If the result of Decision 316 is "No", the printer PTR stores the frame memory having an orientation orthogonal to the image in the page buffer memory 26 (process 319), and sets the rotation angle of the image data as 90° (process 320).

The printer PTR then selects the tray of the multi-level paper feeding unit 28 from which the paper will be drawn (process 321). If the result of Decision 316 is "Yes", the printer PTR selects the tray containing paper of the specified size and having the same orientation as the page layout in the frame memory. If the result of Decision 316 is "No", the printer PTR selects the tray containing paper of the specified size and having the orientation that is orthogonal to the page layout in the frame memory. If the result of Decision 315 is "No", the printer PTR selects the tray containing paper having preset default size and orientation (for example, A4 size SEF).

The printer PTR then writes the print data corresponding to the temporarily stored image data to the frame memory that is stored in the page buffer memory 26 (image plotting process; process 322). The printer PTR prompts the printing unit 27 to carry out printing (process 323) by rotating the image according to the rotation angle set by processes 318 or 320. Thus, the printer PTR gives a print output of a single page.

Once the printed page is output, the printer PTR checks whether the counter i is equal to the number of images k (Decision 324). If the result of Decision 324 is "No", the printer PTR increments the value of the counter i by one to print the next image data (process 325) and returns to process 311.

Once all the image data have been printed, and the result of Decision 324 is "Yes", the printer PTR creates information pertaining to the print result for that round of printing, includes the print result in the "Process result notification" response, and sends it to the requesting terminal (process 326).

If print package layout is specified, and the result of Decision 307 is "No", the printer PTR looks up the package table, gets the page layout ("Portrait" or "Landscape") corresponding to the number of images in the print package (m), and stores the frame memory having the relevant page layout in the page buffer memory 26 as standard layout (process 335).

Next, the printer PTR checks whether the tray containing the paper of the size specified in the "Begin job" command is present in the multi-level paper feeding unit 28 (Decision 336). If the result of Decision 336 is "Yes", the printer PTR checks whether the orientation of the paper (portrait or landscape) is the same as the standard layout (Decision 337). For example, if paper size is specified as A4 and page layout as portrait, the printer PTR checks whether the tray containing A4 size SEF paper is present in the multi-level paper feeding unit 28.

If the result of Decision 337 is "Yes", the printer PTR stores the frame memory having the same orientation as the standard layout in the page buffer memory 26 (process 338), and sets the rotation angle of the image data as 0° (process 339). If the result of Decision 337 is "No", the printer PTR stores the frame memory having an orientation orthogonal to the standard layout in the page buffer memory 26 (process 340), and sets the rotation angle of image data as 90° (process 341).

The printer PTR then selects the tray of the multi-level paper feeding unit 28 from which the paper will be drawn (process 342). If the result of Decision 337 is "Yes", the printer PTR selects the tray containing paper of the specified size and having the same orientation as the page layout in the frame memory. If the result of Decision 337 is "No", the printer PTR selects the tray containing paper of the specified size and having the orientation that is orthogonal to the page layout in the frame memory. If the result of Decision 336 is "No", the printer PTR selects the tray containing paper having preset default size and orientation (for example, A4 size SEF).

After selecting the tray, the printer, PTR resets the counter i that counts the number of images to be printed (process 343) to 1, specifies i-th print image data ID (i) in the "Get file request" response, and sends it to the requesting terminal (process 344).

The printer PTR then receives and temporarily stores the i-th image data (i) sent by the requesting terminal (process 345), and writes the print data corresponding to the temporarily stored image data to the frame memory stored in the page buffer memory 26 (image plotting process; process 346) by rotating the image data according to the rotation angle set in processes 339 or 341.

The printer PTR checks whether print data corresponding to all the images to be printed on one page are written to the frame memory (Decision 347). If the result of Decision 347 is "No", the printer checks whether the value of the counter i is equal to the number of images per page k (Decision.348).

If the result of Decision 348 is "No", the printer PTR increments the value of the counter i by one to place the print data in the empty image area of the page (process 349), and returns to process 345. If the result of Decision 348 is "Yes", the printer PTR prompts the printing unit 27 to carry out printing (process 350). Thus, the printer PTR gives a print output of a single page.

Once all the image data have been printed, the printer PTR creates information pertaining to the print result for that round of printing, includes the print result in the "Process result notification" response, and sends it to the requesting terminal (process 351).

If the result of Decision 347 is "Yes", the printer PTR prompts the printing unit 27 to carry out printing (process 352). Thus, the printer PTR gives a print output of a single page.

Next, the printer PTR checks whether the value of the counter i is equal to the number of images per page k (Decision 353). If the result of Decision 353 is "No", the printer PTR performs process 349 and increments the value of the counter i by one to print the next page.

If the result of Decision 353 is "Yes", the printer PTR performs process 351 and creates information pertaining to the print result for that round of printing, includes the print result in the "Process result notification" response, and sends it to the requesting terminal.

Thus, according to the present invention, a tray selection standard is provided by which the appropriate tray containing paper of the specified size is selected from the multi-level paper feeding unit 28, obviating the need for the paper rotation processing as far as possible. Consequently, the time required for the printing process reduces.

Further, in the present embodiment, in addition to selecting an appropriate tray containing paper of the specified size, rotation process is also carried out as required. Consequently, image is printed in the correct orientation on paper of appropriate size.

If the tray containing paper of the specified side is not available, the tray containing paper having the default size is selected. Consequently, print output is carried out even if paper of specified size is not available.

Figure 6C:
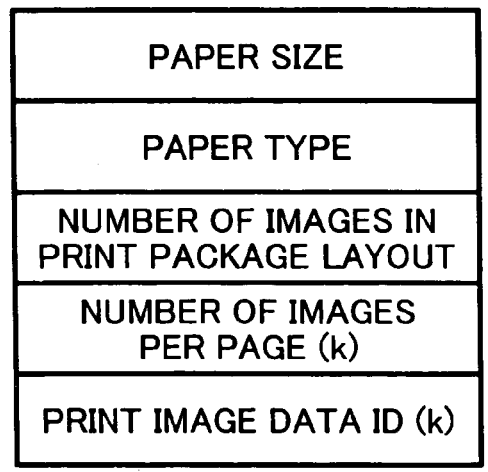
Figure 8A:
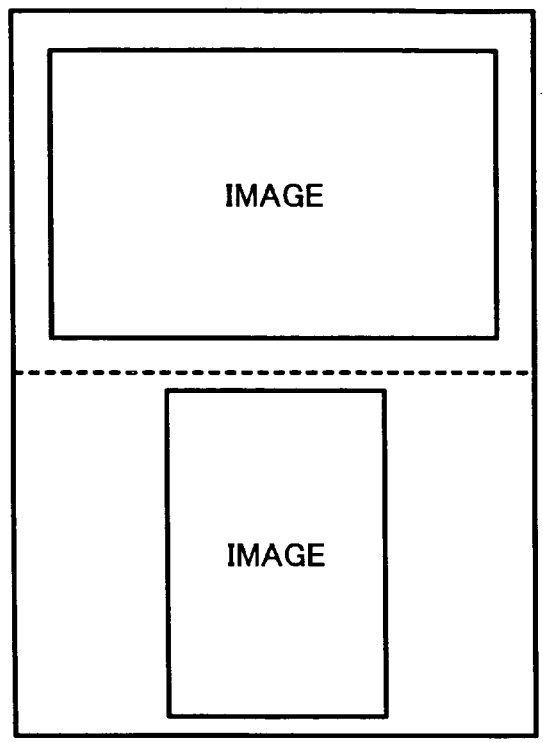
FIG. 8A and FIG. 8B each illustrate an example of page orientation corresponding to a print package layout.
Figure 8B:
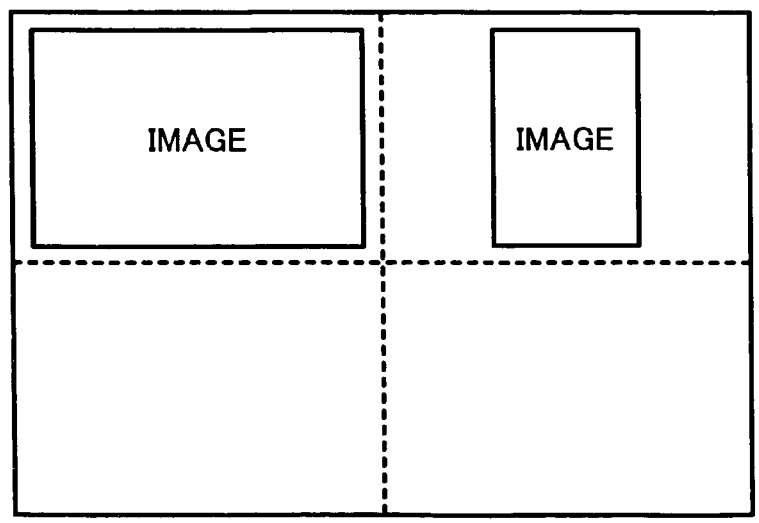
Figure 9A:
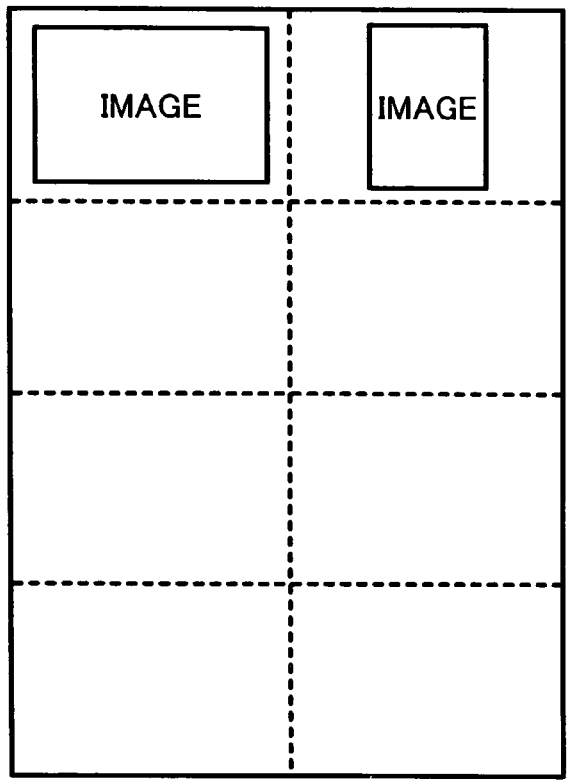
FIG. 9A and FIG. 9B each illustrate an example of page orientation corresponding to a print package layout (continued after FIG. 8B)
Figure 9B:
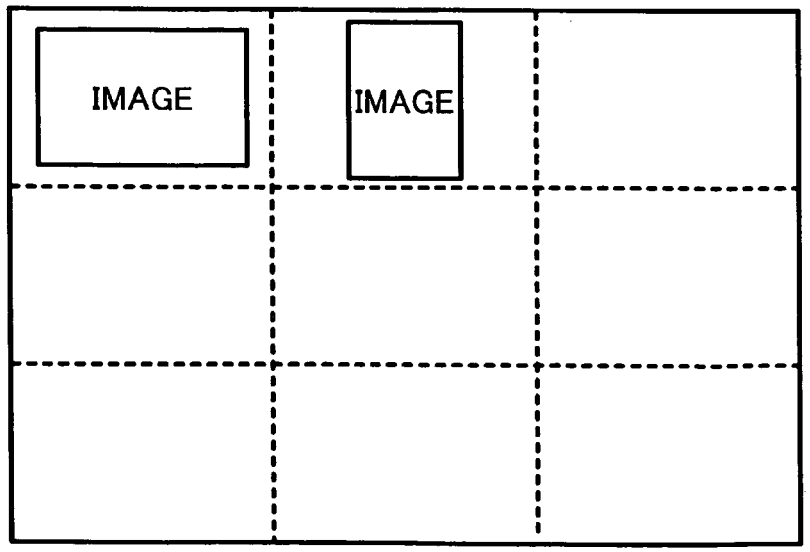
Figure 10A:
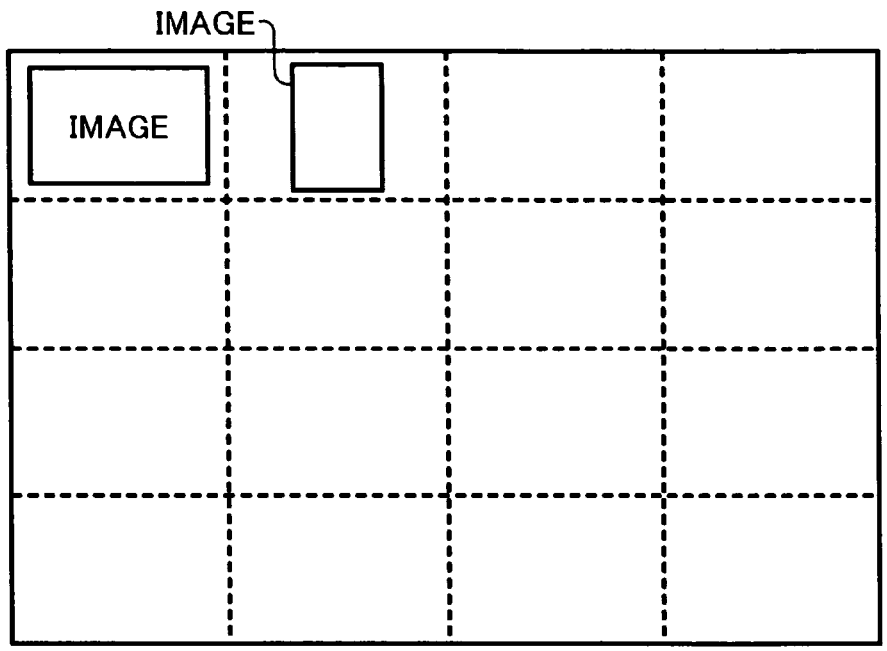
FIG. 10A and FIG. 10B each illustrate an example of page orientation corresponding to a print package layout (continued after FIG. 9B)
Figure 10B:
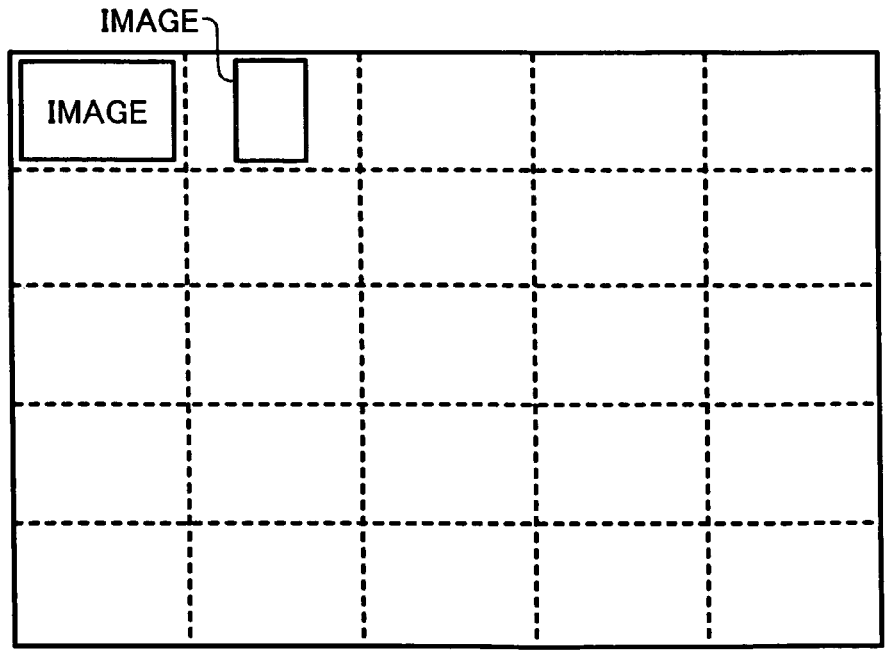
Figure 11:
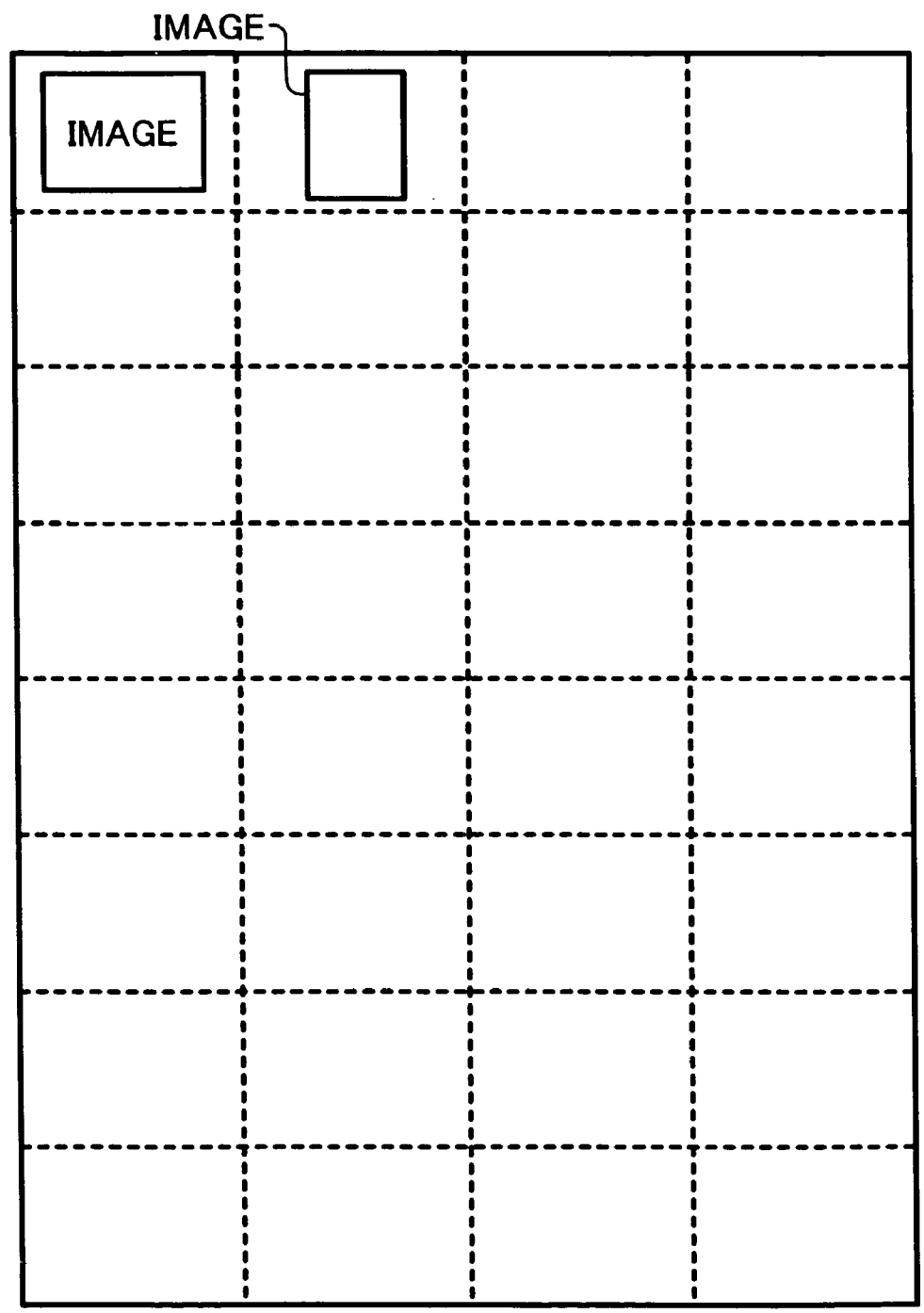
FIG. 11 illustrates an example of page orientation corresponding to a print package layout (continued after FIG. 10B)

Incidentally, when sending the print job data to the printer PTR from an external device, the type of paper on which printing is to be done can also be specified, as shown in FIG. 6C. The paper type can be normal, recycled, or special (such as overhead project (OHP) transparency, etc.).

Figure 20:
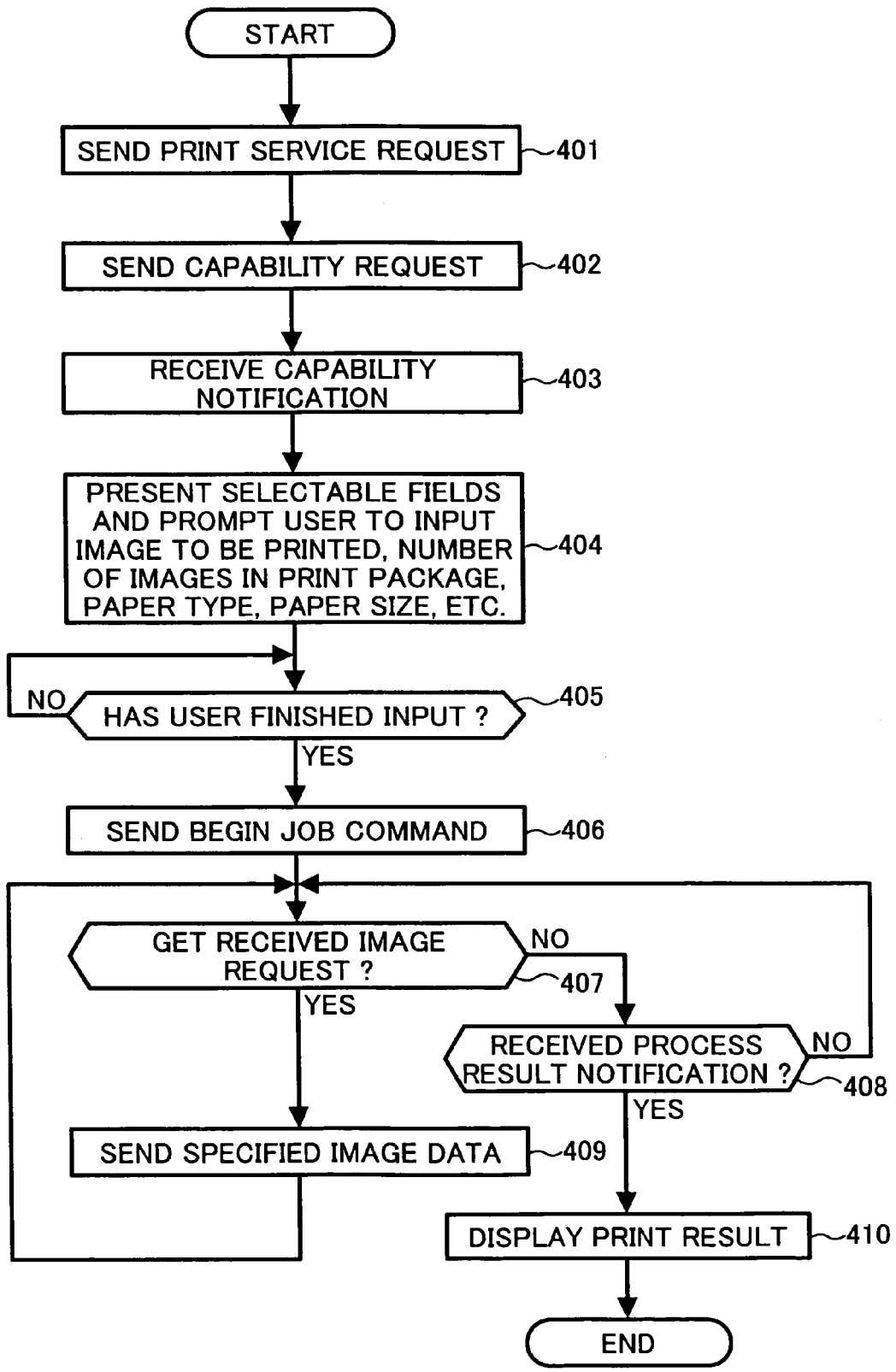
FIG. 20 is a flowchart of another example process executed by the digital still camera DSC (or the data storage device DST) for sending an image data for printing to the printer PTR.

FIG. 20 is a flowchart of another example process executed by the digital still camera DSC (or the data storage device DST) sending an image data for printing to the printer PTR. The print job data in this case includes the paper type, as shown in FIG. 6C. The "Capability notification" response sent by the printer PTR to the external device in this case includes paper type in addition to print quality (Draft/Standard/High quality, etc.), paper size, acceptable image format, date output, print package, etc.

The user connects the digital still camera DSC and the printer PTR by a USB cable and gives a print command on the digital still camera DSC.

The digital still camera DSC sends a "Print service request" command to the printer PTR followed by a "Capability request" command (processes 401 and 402).

The digital still camera (DSC) receives a "Capability notification" response from the printer PTR (process 403). Based on the capability information included in the "Capability notification" response, the digital still camera DSC prompts the user to input the printing conditions (such as, print quality, paper size, paper type, disable/enable date output, print package, etc.) and select the image for printing (process 404).

Once the user input is complete ("Yes" for Decision 405), the digital still camera DSC sends a "Begin job" command that includes print job data as shown in FIG. 6C (process 406).

In response, the digital still camera DSC waits for either a "Get image request" or a "Process result notification" from the printer PTR ("No loop" of Decisions 407 and 408).

When the result of Decision 407 is "Yes" upon receiving a "Get image request" response, the digital still camera DSC reads the image data corresponding to the specified print image data ID, and sends it to the printer PTR (process 409).

When the result of Decision 408 is "Yes" upon receiving a "Process result notification" response, the digital still camera DSC outputs the print result on the display (process 410), and ends the task on hand.

Figure 21:
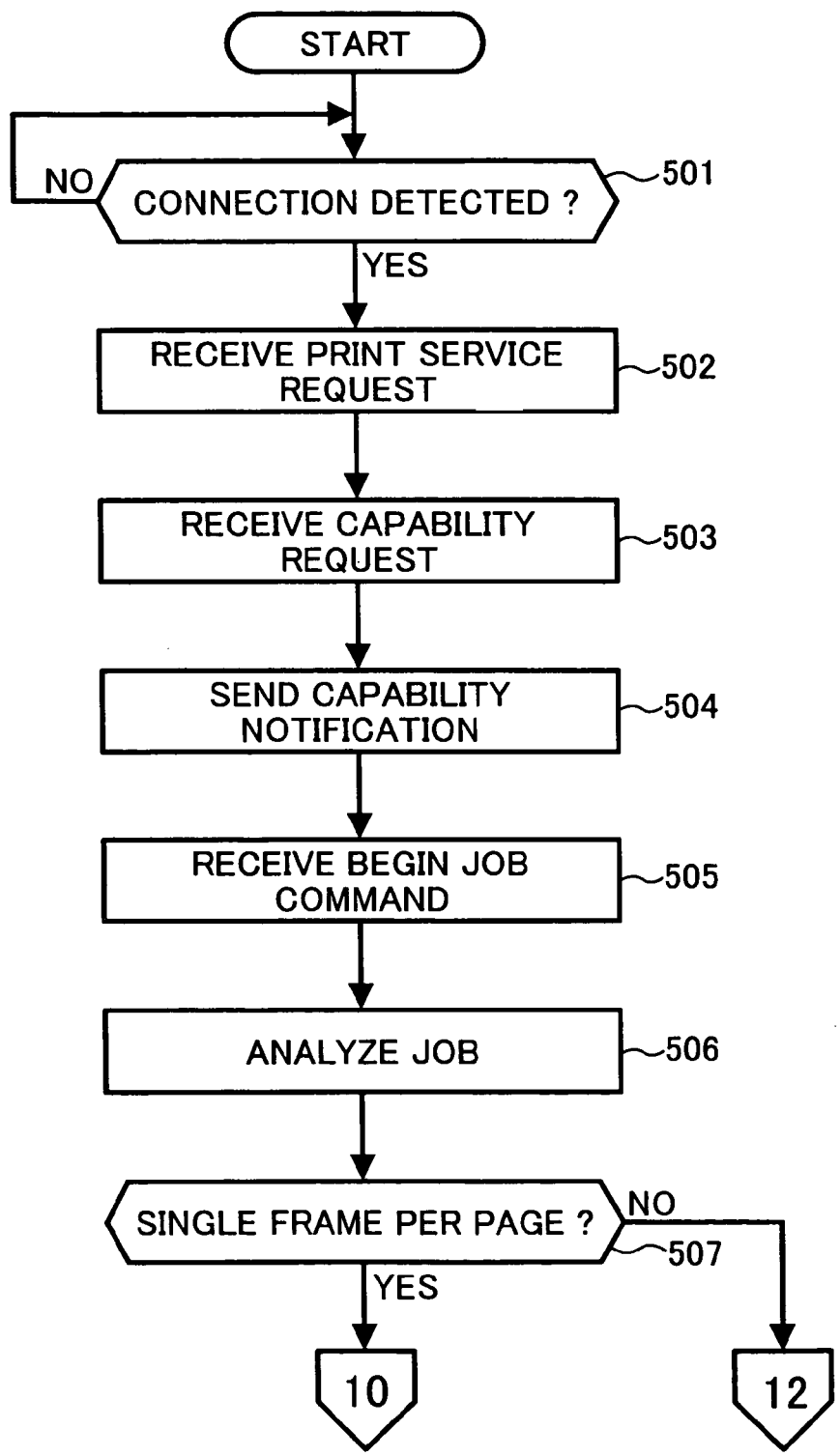
FIG. 21 is a flowchart of a third example process executed by the printer PTR upon receiving a print service request from the digital still camera DSC (or the data storage device DST)
Figure 22B:
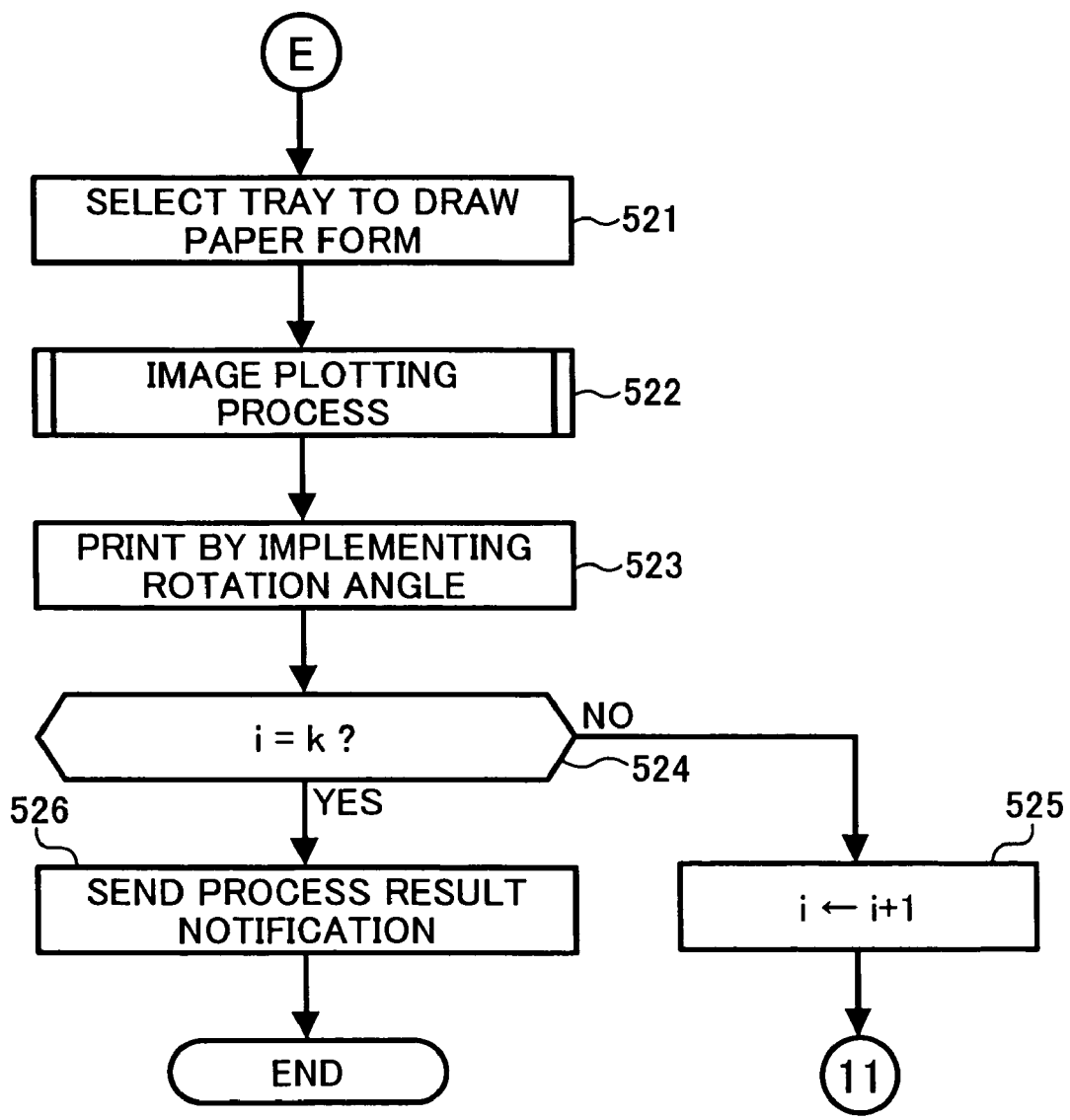
FIG. 22 is a second flowchart of the third example process executed by the printer PTR upon receiving a print service request from the digital still camera DSC (or the data storage device DST)
Figure 23B:
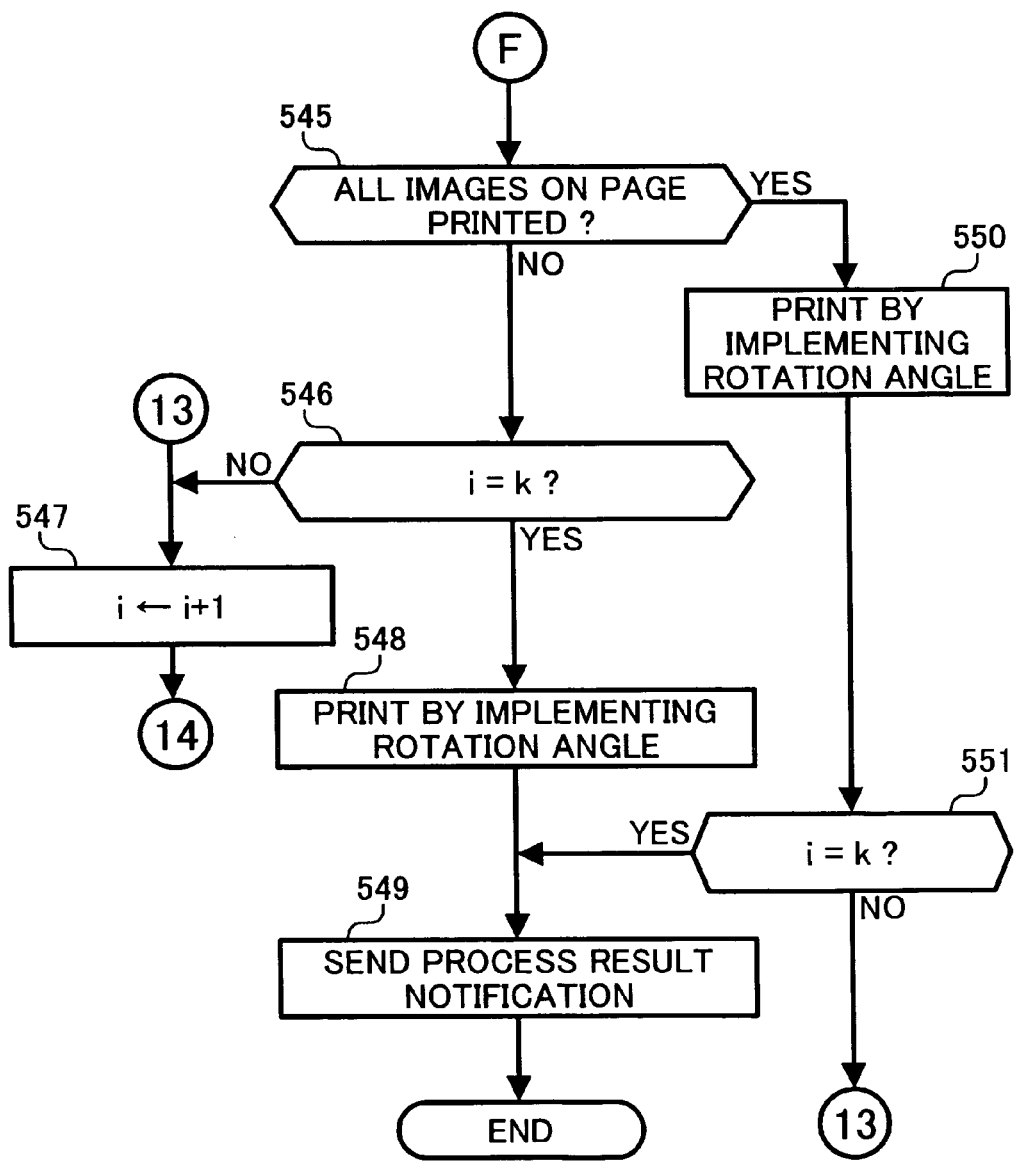
FIG. 23 is a third flowchart of the third example process executed by the printer PTR upon receiving a print service request from the digital still camera DSC (or the data storage device DST)

FIG. 21 through FIG. 23 are flowcharts of a third example process executed by the printer PTR upon receiving a print service request from the digital still camera DSC or the data storage device DST. The rotation process function of the printing unit 27 is used for carrying out paper rotation.

If connection by the USB cable is detected ("Yes" for Decision 501), the printer PTR receives the "Print service request" command from the requesting terminal (process 502). The printer PTR receives the subsequent "Capability request" (process 503), and sends the "Capability notification" (process 504) in response.

Upon receiving the "Begin job" command (process 505), the printer PTR analyzes its contents (process 506) and checks whether the print mode specified is for one image per page ("single frame per page" mode) (Decision 507).

If the result of Decision 507 is "Yes", the printer PTR resets a counter 'i' of the number of pages to 1 (process 510) and sends a "Get file request" response specifying the i-th print image data ID (i) to the requesting terminal (process 511).

The printer PTR then receives and temporarily stores the i-th image data (i) sent by the requesting terminal (process 512), and analyzes the header portion of the image data (i) (process 513) to check whether the orientation of the image is landscape (h<w) (Decision 514). If the result of Decision 514 is "Yes", the printer PTR stores the frame memory having a landscape page layout in the page buffer memory 26 (process 515). If the result of Decision 514 is "No", the printer PTR holds the frame memory having a portrait page layout in the page buffer memory 26 (process 516).

Next, the printer PTR checks whether the tray containing the paper of the size specified in the "Begin job" command is present in the multi-level paper feeding unit 28 (Decision 517). If the result of Decision 517 is "Yes", the printer PTR checks whether the orientation (portrait or landscape) of the paper is the same as the page layout in the frame memory (Decision 518). For example, if paper size is specified as A4 and page layout as portrait, the printer PTR checks whether the tray containing A4 size SEF paper is present in the multi-level paper feeding unit 28.

If the result of Decision 518 is "Yes", the printer PTR sets the rotation angle at the time of printing as 0° (process 519). If the result of Decision 518 is "No", the printer PTR sets the rotation angle at the time of printing as 900 (process 520). If the result of Decision 517 is "No", the printer PTR advances to process 519 and sets the rotation angle at the time of printing as 0°.

The printer PTR then selects the tray of the multi-level paper feeding unit 28 from which the paper will be drawn (process 521). If the result of Decision 518 is "Yes", the printer PTR selects the tray containing paper of the specified size and type, and having the same orientation as the page layout in the frame memory. If the result of Decision 518 is "No", the printer PTR selects the tray containing paper of the specified size and type, and having the orientation that is orthogonal to the page layout in the frame memory. If the result of Decision 517 is "No", the printer PTR selects the tray containing paper having preset default size, type, and orientation (for example, A4 size SEF, and "Ordinary" paper type).

The printer PTR then writes the print data corresponding to the temporarily stored image data to the frame memory that is stored in the page buffer memory 26 (image plotting process; process 522). The printer PTR prompts the printing unit 27 to carry out printing by manipulating the paper according to the rotation angle set by processes 519 or 520 (process 523). Thus, the printer PTR gives a print output of a single page.

Once the printed page is output, the printer PTR checks whether the counter i is equal to the number of images k (Decision 524). If the result of Decision 524 is "No", the printer PTR increments the value of the counter i by one to print the next image data (process 525) and returns to process 511.

Once all the image data have been printed, and the result of Decision 524 is "Yes", the printer PTR creates information pertaining to the print result for that round of printing, includes the print result in the "Process result notification" response, and sends it to the requesting terminal (process 526).

If print package layout is specified, and the result of Decision 507 is "No", the printer PTR looks up the package table, gets the page layout ("Portrait" or "Landscape") corresponding to the number of images in the print package (m), and stores the frame memory having the relevant page layout in the page buffer memory 26 (process 535).

Next, the printer PTR checks whether the tray containing the paper of the size and type specified in the "Begin job" command is present in the multi-level paper feeding unit 28 (Decision 536). If the result of Decision 536 is "Yes", the printer PTR checks whether the orientation of the paper (portrait or landscape) is the same as the page layout in the frame memory (Decision 537). For example, if paper size is specified as A4 and page layout as portrait, the printer PTR checks whether the tray containing A4 size SEF paper in is present in the multi-level paper feeding unit 28.

If the result of Decision 537 is "Yes", the printer PTR sets the rotation angle at the time of printing as 0° (process 538). If the result of Decision 537 is "No", the printer PTR sets the rotation angle at the time of printing as 90° (process 539). If the result of Decision 536 is "No", the printer PTR advances to process 538 and sets the rotation angle at the time of printing as 0°.

The printer PTR then selects the tray of the multi-level paper feeding unit 28 from which the paper will be drawn (process 540). If the result of Decision 537 is "Yes", the printer PTR selects the tray containing paper of the specified size and type, and having the same orientation as the page layout in the frame memory. If the result of Decision 537 is "No", the printer PTR selects the tray containing paper of the specified size and type, and having the orientation that is orthogonal to the page layout in the frame memory. If the result of Decision 536 is "No", the printer PTR selects the tray containing paper having preset default size, type, and orientation (for example, A4 size SEF, and "Ordinary" paper type).

After selecting the tray, the printer PTR resets to 1 the counter i that counts the number of images to be printed (process 541) to 1, specifies i-th print image data ID (i) in the "Get file request" response, and sends it to the requesting terminal (process 542).

The printer PTR then receives and temporarily stores the i-th image data (i) sent by the requesting terminal (process 543), and writes the print data corresponding to the temporarily stored image data to the frame memory stored in the page buffer memory 26 (image plotting process; process 544).

The printer PTR checks whether print data corresponding to all the images to be printed on one page are written to the frame memory (Decision 545). If the result of Decision 545 is "No", the printer checks whether the value of the counter i is equal to the number of images per page k (Decision 546).

If the result of Decision 546 is "No", the printer PTR increments the value of the counter i by one to place the print data in the empty image area of the page (process 547), and returns to process 542. If the result of Decision 546 is "Yes", the printer PTR prompts the printing unit 27 to carry out printing by manipulating the paper according to the rotation angle set by processes 538 or 539 (process 548). Thus, the printer PTR gives a print output of a single page.

Once all the image data have been printed, the printer PTR creates information pertaining to the print result for that round of printing, includes the print result in the "Process result notification" response, and sends it to the requesting terminal (process 549).

If the result of Decision 545 is "Yes", the printer PTR prompts the printing unit 27 to carry out printing by manipulating the paper according to the rotation angle set by processes 538 or 539 (process 550). Thus, the printer PTR gives a print output of a single page.

Next, the printer PTR checks whether the value of the counter i is equal to the number of images per page k (Decision 551). If the result of Decision 551 is "No", the printer PTR performs process 547 and increments the value of the counter i by one to print the next page.

If the result of Decision 551 is "Yes", the printer PTR performs process 549 and creates information pertaining to the print result for that round of printing, includes the print result in the "Process result notification" response, and sends it to the requesting terminal.

Figure 24:
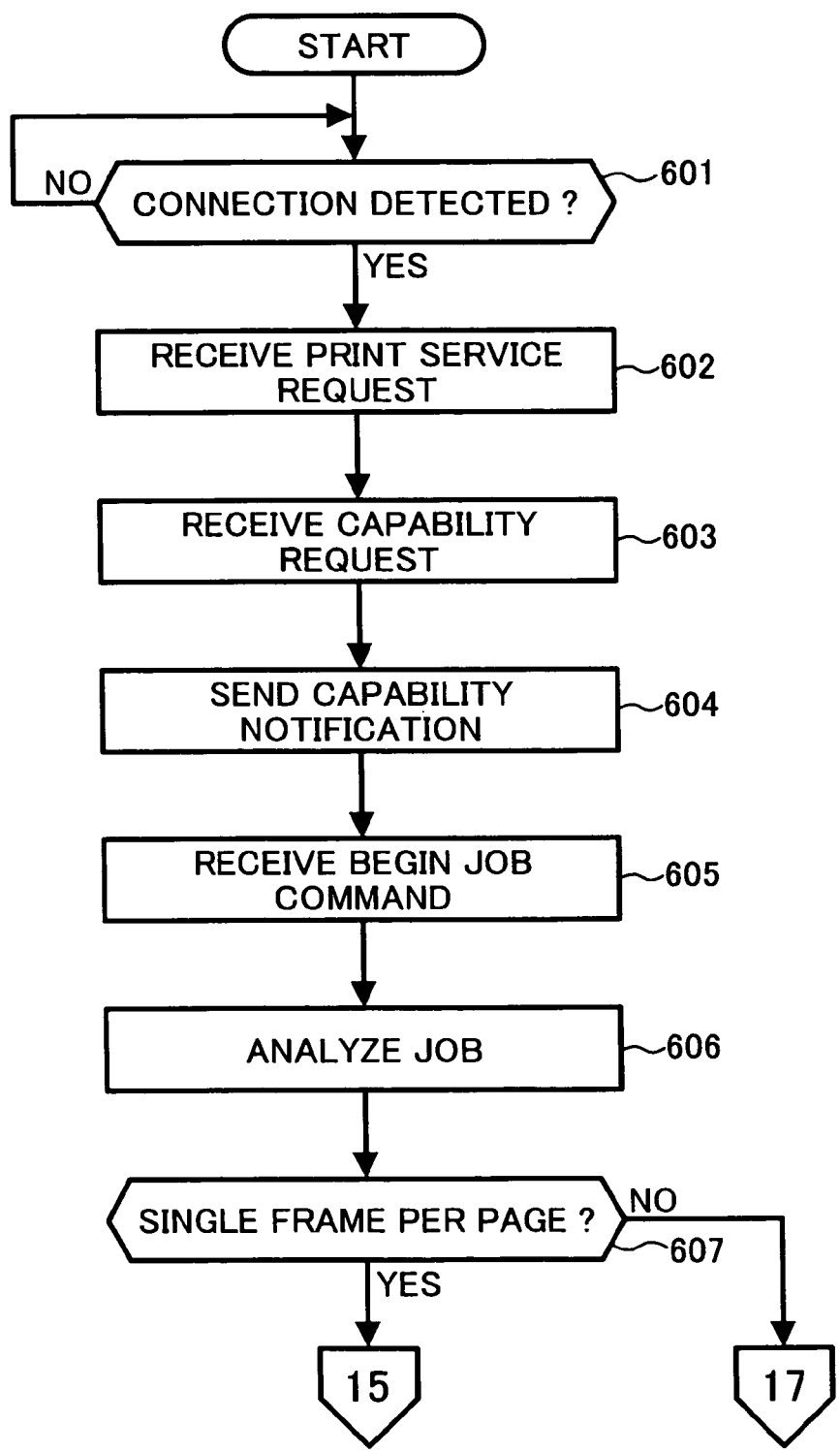
FIG. 24 is a flow chart of a fourth example process executed by the printer PTR upon receiving a print service request from the digital still camera DSC (or the data storage device DST)
Figure 25A:
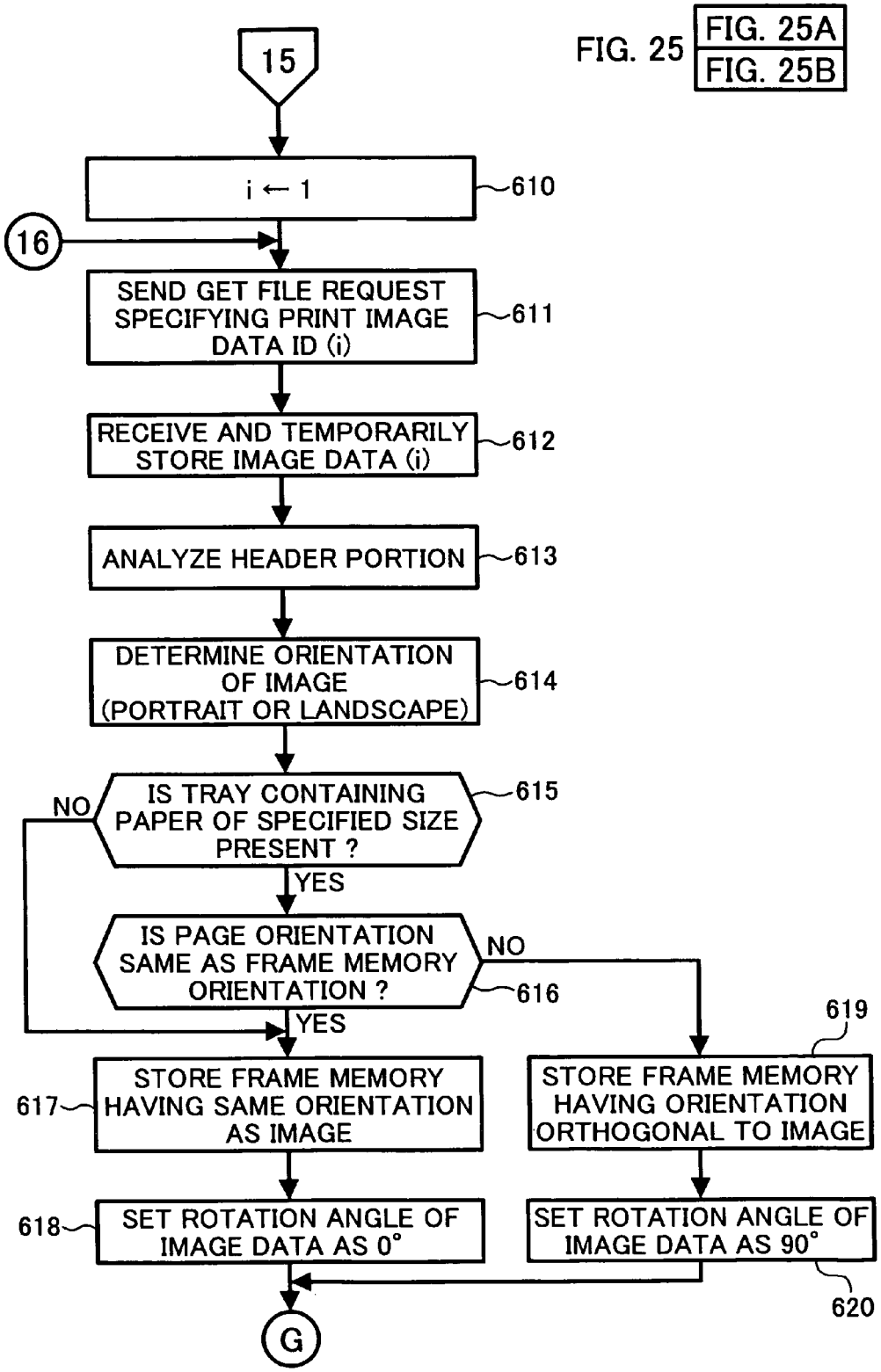
FIG. 25 is a second flowchart of the fourth example process executed by the printer PTR upon receiving a print service request from the digital still camera DSC (or the data storage device DST)
Figure 25B:
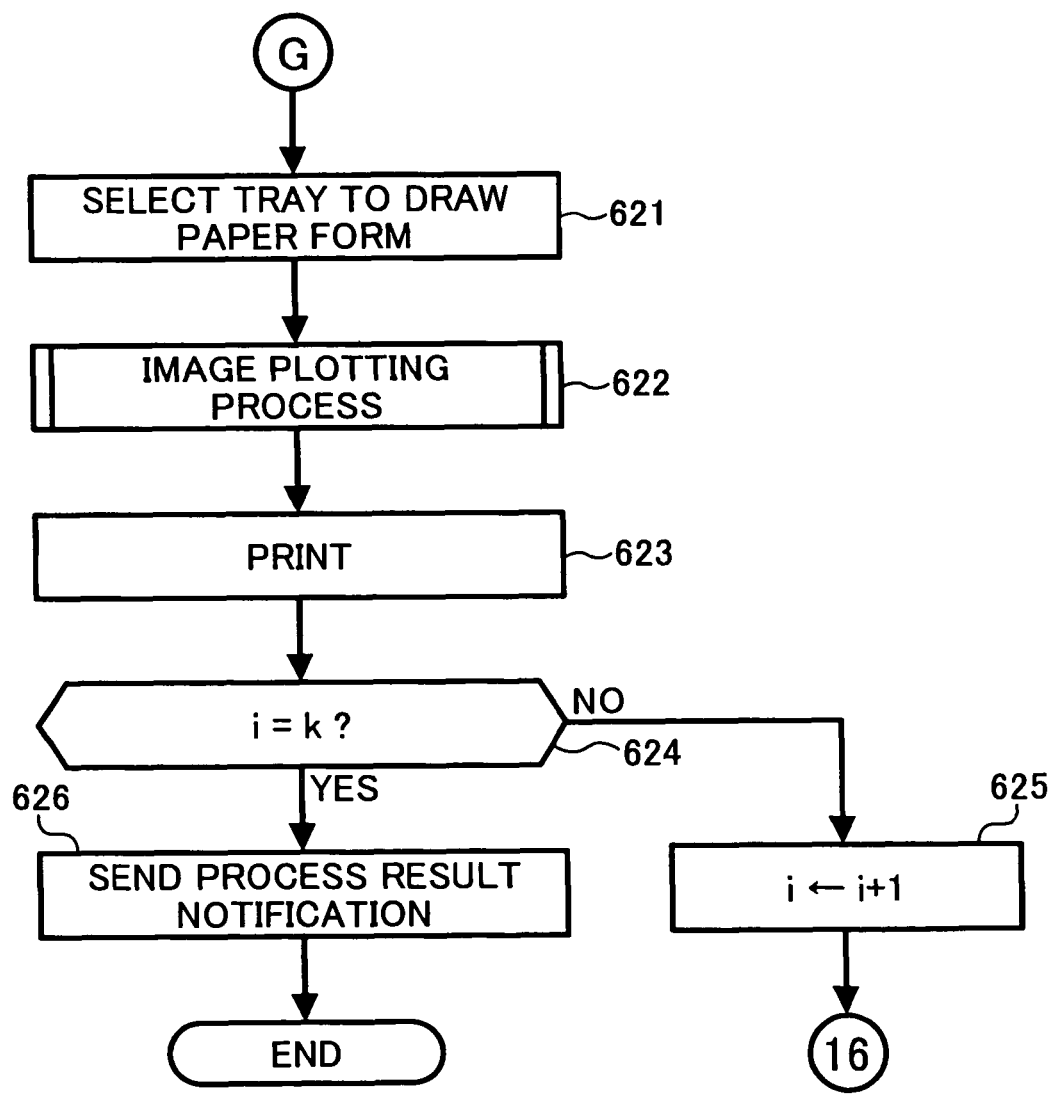
Figure 26B:
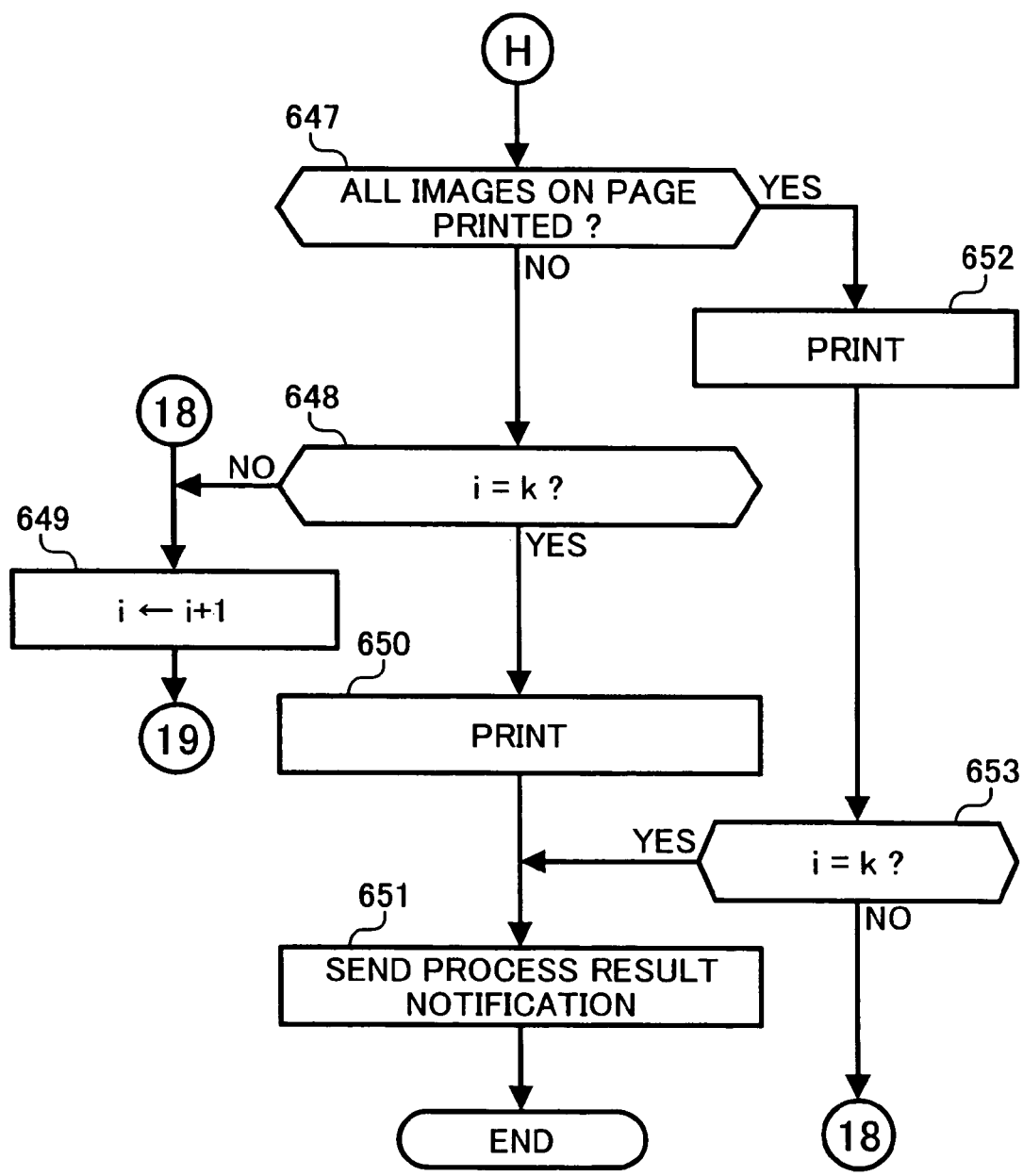
FIG. 26 is a third flowchart of the fourth example process executed by the printer PTR upon receiving a print service request from the digital still camera DSC (or the data storage device DST).

FIG. 24 through FIG. 26 are flowcharts of a fourth example process executed by the printer PTR upon receiving a print service request from the digital still camera DSC or the data storage device DST. In this instance, the rotation process function of the system controller 21 is used for carrying out paper rotation.

If connection by the USB cable is detected ("Yes" for Decision 601), the printer PTR receives the "Print service request" command from the requesting terminal (process 602). The printer PTR receives the subsequent "Capability request" (process 603), and sends the "Capability notification" (process 604) in response.

Upon receiving the "Begin job" command (process 605), the printer PTR analyzes its contents (process 606) and checks whether the print mode specified is for one image per page ("single frame per page" mode) (Decision 607).

If the result of Decision 607 is "Yes", the printer PTR resets a counter i of the number of pages to 1 (process 610) and sends a "Get file request" response specifying the i-th print image data ID (i) to the requesting terminal (process 611).

The printer PTR then receives and temporarily stores the i-th image data (i) sent by the requesting terminal (process 612), and analyzes the header portion of the image data (i) (process 613) to check whether the orientation of the image is landscape (Decision 614).

Next, the printer PTR checks whether the tray containing the paper of the size and type specified in the "Begin job" command is present in the multi-level paper feeding unit 28 (Decision 615). If the result of Decision 615 is "Yes", the printer PTR checks whether the orientation (portrait or landscape) of the paper is the same as the page layout in the frame memory (Decision 616). For example, if paper size is specified as A4 and page layout as portrait, the printer PTR checks whether the tray containing A4 size SEF paper is present in the multi-level paper feeding unit 28.

If the result of Decision 616 is "Yes", the printer PTR stores the frame memory having the same orientation as the image in the page buffer memory 26 (process 617), and sets the rotation angle of the image data as 0° (process 618). If the result of Decision 616 is "No", the printer PTR stores the frame memory having an orientation orthogonal to the image in the page buffer memory 26 (process 619), and sets the rotation angle of the image data as 90° (process 620).

The printer PTR then selects the tray of the multi-level paper feeding unit 28 from which the paper will be drawn (process 621). If the result of Decision 316 is "Yes", the printer PTR selects the tray containing paper of the specified size and type, and having the same orientation as the page layout in the frame memory. If the result of Decision 616 is "No", the printer PTR selects the tray containing paper of the specified size and type, and having the orientation that is orthogonal to the page layout in the frame memory. If the result of Decision 615 is "No", the printer PTR selects the tray containing paper having preset default size, type, and orientation (for example, A4 size SEF, and "Ordinary" paper type).

The printer PTR then writes the print data corresponding to the temporarily stored image data to the frame memory that is stored in the page buffer memory 26 (image plotting process; process 622). The printer PTR prompts the printing unit 27 to carry out printing (process 623) by rotating the image according to the rotation angle set by processes 618 or 620. Thus, the printer PTR gives a print output of a single page.

Once the printed page is output, the printer PTR checks whether the counter i is equal to the number of images k (Decision 624). If the result of Decision 624 is "No", the printer PTR increments the value of the counter i by one to print the next image data (process 325) and returns to process 611.

Once all the image data have been printed, and the result of Decision 624 is "Yes", the printer PTR creates information pertaining to the print result for that round of printing, includes the print result in the "Process result notification" response, and sends it to the requesting terminal (process 626).

If print package layout is specified, and the result of Decision 607 is "No", the printer PTR looks up the package table, gets the page layout ("Portrait" or "Landscape") corresponding to the number of images in the print package (m), and holds the frame memory having the relevant page layout in the page buffer memory 26 (process 635).

Next, the printer PTR checks whether the tray containing the paper of the size specified in the "Begin job" command is present in the multi-level paper feeding unit 28 (Decision 636). If the result of Decision 636 is "Yes", the printer PTR checks whether the orientation of the paper (portrait or landscape) is the same as the standard layout (Decision 637). For example, if paper size is specified as A4 and page layout as portrait, the printer PTR checks whether the tray containing A4 size SEF paper is present in the multi-level paper feeding unit 28.

If the result of Decision 637 is "Yes", the printer PTR stores the frame memory having the same orientation as the standard layout in the page buffer memory 26 (process 638), and sets the rotation angle of the image data as 0° (process 639). If the result of Decision 637 is "No", the printer PTR stores the frame memory having an orientation orthogonal to the standard layout in the page buffer memory 26 (process 640), and sets the rotation angle of the image data as 90° (process 641).

The printer PTR then selects the tray of the multi-level paper feeding unit 28 from which the paper will be drawn (process 642). If the result of Decision 637 is "Yes", the printer PTR selects the tray containing paper of the specified size and type, and having the same orientation as the page layout in the frame memory. If the result of Decision 637 is "No", the printer PTR selects the tray containing paper of the specified size and type, and having the orientation that is orthogonal to the page layout in the frame memory. If the result of Decision 636 is "No", the printer PTR selects the tray containing paper having preset default size, type, and orientation (for example, A4 size SEF, and "Ordinary" paper type).

After selecting the tray, the printer PTR resets the counter i that counts the number of images to be printed (process 643) to 1, specifies i-th print image data ID (i) in the "Get file request" response, and sends it to the requesting terminal (process 644).

The printer PTR then receives and temporarily stores the i-th image data (i) sent by the requesting terminal (process 645), and writes the print data corresponding to the temporarily stored image data to the frame memory stored in the page buffer memory 26 (image plotting process; process 646) by rotating the image data according to the rotation angle set in processes 639 or 641.

The printer PTR checks whether print data corresponding to all the images to be printed on one page are written to the frame memory (Decision 647). If the result of Decision 647 is "No", the printer checks whether the value of the counter i is equal to the number of images per page k (Decision 648).

If the result of Decision 648 is "No", the printer PTR increments the value of the counter i by one to place the print data in the empty image area of the page (process 649), and returns to process 645. If the result of Decision 648 is "Yes", the printer PTR prompts the printing unit 27 to carry out printing (process 650). Thus, the printer PTR gives a print output of a single page.

Once all the image data have been printed, the printer PTR creates information pertaining to the print result for that round of printing, includes the print result in the "Process result notification" response, and sends it to the requesting terminal (process 651).

If the result of Decision 647 is "Yes", the printer PTR prompts the printing unit 27 to carry out printing (process 652). Thus, the printer PTR gives a print output of a single page.

Next, the printer PTR checks whether the value of the counter i is equal to the number of images per page k (Decision 653). If the result of Decision 653 is "No", the printer PTR performs process 649 and increments the value of the counter i by one to print the next page.

If the result of Decision 653 is "Yes", the printer PTR performs process 651 and creates information pertaining to the print result for that round of printing, includes the print result in the "Process result notification" response, and sends it to the requesting terminal.

Thus, according to the present invention, a tray selection standard is provided by which the appropriate tray containing paper of the specified size is selected from the multi-level paper feeding unit 28, obviating the need for the paper rotation processing as far as possible. Consequently, the time required for the printing process reduces.

In the present embodiment, a digital still camera and a data storage device function as the external devices bearing the image data to be printed by connecting to the printer. However, the external device may be any other device having functions similar to a digital still camera or a data storage device.

According to the present invention, flaws during printing such as partial loss of image, etc. can be prevented. Additionally, time required for the output of a printed matter reduces by obviating the need for image rotation as far as possible.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A digital image printing system, comprising:
   a printing apparatus that includes a direct printing function to print digital image data; and
   a digital camera capable of capturing an image and storing digital data of the captured image, wherein the digital camera is configured to directly send the digital image data to the printing apparatus and specify paper size of the digital image data for printing, wherein
   the printing apparatus includes:
      a paper feeding unit having a multi-tray structure;
      a first determining unit configured to analyze a header portion of the image data received from the digital camera to thereby determine whether an orientation of the digital image data is landscape or portrait;
      a second determining unit configured to determine whether a tray containing paper of the paper size specified by the digital camera is present in the paper feeding unit; and
      a third determining unit configured to, when the second determining unit determines that the tray is present in the paper feeding unit, determine whether paper in the same orientation as the orientation of the digital image data determined by the first determining unit is available in the tray, wherein
      the printing apparatus is configured to, only when the third determining unit determines that the paper in the same orientation as the orientation of the digital image is not available, rotate the digital image data by 90° in any one of a clockwise direction and a counter-clockwise direction.

2. The digital image printing system according to claim 1, wherein
   the printing apparatus is further configured to, when the second determining unit determines that the tray containing paper of the paper size specified by the digital camera is not present, select a tray containing paper in portrait orientation when the first determining unit determines that the orientation of the digital image data is portrait, and select a tray containing paper in landscape orientation when the first determining unit determines that the orientation of the digital image data is landscape.

3. The digital image printing system according to claim 1, wherein
   the printing apparatus further includes a memory unit that stores a print package table containing a standard page layout orientation associated with each of a plurality of print package layouts, the print package layout specifying a number of images to be printed on one page,
   the digital camera is further configured to specify a print package layout,
   the third determining unit is further configured to, when the second determining unit determines that the tray is present in the paper feeding unit, determine whether paper in the same orientation as the standard page layout orientation corresponding to the print package layout is available in the tray, and
   the printing apparatus is further configured to, only when the third determining unit determines that the paper in the same orientation as the standard page layout orientation corresponding to the print package layout is not available, rotate the packaged digital images by 90° in any one of a clockwise direction and a counter-clockwise direction.

4. The digital image printing system according to claim 3, wherein
   the printing apparatus is further configured to, when the second determining unit determines that the tray containing paper of the paper size specified by the digital camera is not present, select a tray containing paper having the same orientation as the standard page layout orientation.

5. A printing apparatus configured to connect to and exchange digital image data, including a print package layout, with a digital camera, the printing apparatus comprising:
   a paper feeding unit having a multi-tray structure;
   a first determining unit configured to analyze a header portion of the image data received from the digital camera to thereby determine whether an orientation of the digital image data is landscape or portrait;
   a second determining unit configured to determine whether a tray containing paper of the paper size specified by the digital camera is present in the paper feeding unit; and
   a third determining unit configured to, when the second determining unit determines that the tray is present in the paper feeding unit, determine whether paper in the same orientation as the orientation of the digital image data determined by the first determining unit is available in the tray, wherein
   the printing apparatus is configured to, only when the third determining unit determines that the paper in the same orientation as the orientation of the digital image is not available, rotate the digital image data by 90° in any one of a clockwise direction and a counter-clockwise direction.

6. The printing apparatus according to claim 5, wherein
   when the second determining unit determines that the tray containing paper of the paper size specified by the digital camera is not present, the printing apparatus is further configured to select a tray containing paper in portrait orientation when the first determining unit determines that the orientation of the digital image data is portrait, and select a tray containing paper in landscape orientation when the first determining unit determines that the orientation of the digital image data is landscape.

7. The printing apparatus according to claim 5, further comprising a memory unit that stores a print package table containing a standard page layout orientation associated with each of a plurality of print package layouts, the print package layout specifying a number of images to be printed on one page, wherein the third determining unit is further configured to, when the second determining unit determines that the tray is present in the paper feeding unit, determine whether paper in the same orientation as the standard page layout orientation corresponding to the print package layout is available in the tray, and the printing apparatus is further configured to, only when the third determining unit determines that the paper in the same orientation as the standard page layout orientation corresponding to the print package layout is not available, rotate the packaged digital images by 90° in any one of a clockwise direction and a counter-clockwise direction.

8. The printing apparatus according to claim 7, wherein when the second determining unit determines that the tray containing paper of the paper size specified by the digital camera is not present, the printing apparatus is further configured to select a tray containing paper having the same orientation as the standard page layout orientation.

9. A method for controlling a digital image printing system that includes a printing apparatus capable of printing the digital image data and a digital camera capable of capturing an image and storing digital image data of the captured image, the digital camera being configured to directly send the digital image data to the printing apparatus and specify paper size of the digital image data for printing, the method comprising:

determining whether an orientation of digital image data received from the digital camera by the printing apparatus is landscape or portrait by analyzing a header portion of the digital image data received from the digital camera;

determining whether a tray in a paper feeding unit of the printing apparatus contains paper of a paper size specified by the digital camera is present;

determining, whether paper in the same orientation as the orientation of the digital image data determined by the first determining unit is available in the tray when it is determined that the tray is present in the paper feeding unit; and rotating the digital image data by 90° in any one of a clockwise direction and a counter-clockwise direction when it is determined that the paper in the same orientation as the orientation of the digital image is not available.

10. The method according to claim 9, wherein when it is determined that the tray containing paper of the paper size specified by the digital camera is not present, selecting a tray containing paper in portrait orientation when it is determined that the orientation of the digital image data is portrait, and selecting a tray containing paper in landscape orientation when it is determined that the orientation of the digital image data is landscape.

11. The method according to claim 9, further comprising:
receiving a print package layout, including a standard page layout, in the printing apparatus from the digital camera;

determining whether paper in the same orientation as the standard page layout orientation corresponding to the print package layout is available in the tray when the it is determined that the tray is present in the paper feeding unit; and rotating packaged digital images by 90° in any one of a clockwise direction and a counter-clockwise direction only when it is determined that the paper in the same orientation as the standard page layout orientation corresponding to the print package layout is not available.

12. The method according to claim 11, further comprising:
selecting a tray containing paper having the same orientation as the standard page layout orientation when it is determined that the tray containing paper of the paper size specified by the digital camera is not present.

* * * * *